(12) United States Patent
Ono

(10) Patent No.: US 11,457,202 B2
(45) Date of Patent: Sep. 27, 2022

(54) IMAGING DEVICE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/206,163

(22) Filed: Mar. 19, 2021

(65) Prior Publication Data

US 2021/0211633 A1 Jul. 8, 2021

Related U.S. Application Data

(63) Continuation of application No. PCT/JP2019/038018, filed on Sep. 26, 2019.

(30) Foreign Application Priority Data

Oct. 3, 2018 (JP) .............................. JP2018-188418

(51) Int. Cl.
*H04N 13/218* (2018.01)
*G02B 27/28* (2006.01)
*G03B 11/00* (2021.01)

(52) U.S. Cl.
CPC ......... *H04N 13/218* (2018.05); *G02B 27/288* (2013.01); *G03B 11/00* (2013.01)

(58) Field of Classification Search
None
See application file for complete search history.

(56) References Cited

U.S. PATENT DOCUMENTS

| 8,605,197 | B2 | 12/2013 | Ono |
| 8,854,525 | B2 | 10/2014 | Imamura |
| 2009/0179143 | A1 | 7/2009 | Murooka et al. |
| 2012/0212587 | A1* | 8/2012 | Otani ................... H04N 13/225 348/E13.074 |

(Continued)

FOREIGN PATENT DOCUMENTS

| EP | 2624540 | 8/2013 |
| JP | 2009169096 | 7/2009 |

(Continued)

OTHER PUBLICATIONS

Neal J. Brock et al., "Snap-shot Imaging Polarimeter: Performance and Applications", Proceedings of SPIE, May 21, 2014, pp. 1-12.

(Continued)

*Primary Examiner* — Eileen M Adams
(74) *Attorney, Agent, or Firm* — JCIPRNET

(57) ABSTRACT

Provided is an imaging device that can acquire three independent high-quality images using one imaging element. An imaging device includes: an optical system (10) including three optical regions (12A, 12B, 12C) that transmit light in different polarization directions; an imaging element (100) including a plurality of pixel units each of which is a set of three pixels that receive light in different polarization directions; and an image processing unit (200) that calculates three pixel signals (X1, X2, X3) corresponding to each of the optical regions (12A, 12B, 12C) of the optical system (10) from three pixel signals (x1, x2, x3) obtained from each pixel unit of the imaging element (100) to generate an image of each of the optical regions (12A, 12B, 12C).

12 Claims, 23 Drawing Sheets

(56) References Cited

U.S. PATENT DOCUMENTS

| | | | |
|---|---|---|---|
| 2015/0192758 A1* | 7/2015 | Yamagata | H04N 5/359 348/360 |
| 2015/0319409 A1* | 11/2015 | Imamura | G02B 27/0006 348/335 |
| 2017/0155820 A1* | 6/2017 | Kikuchi | H04N 5/225 |
| 2017/0223339 A1 | 8/2017 | Kondo et al. | |
| 2018/0180486 A1 | 6/2018 | Pau | |

FOREIGN PATENT DOCUMENTS

| | | |
|---|---|---|
| WO | 2012043211 | 4/2012 |
| WO | 2012143983 | 10/2012 |
| WO | 2015004886 | 1/2015 |
| WO | 2015198851 | 12/2015 |

OTHER PUBLICATIONS

"Search Report of Europe Counterpart Application", dated Oct. 4, 2021, p. 1-p. 10.

"International Search Report (Form PCT/ISA/210) of PCT/JP2019/038018," dated Dec. 17, 2019, with English translation thereof, pp. 1-5.

"Written Opinion of the International Searching Authority (Form PCT/ISA/237) of PCT/JP2019/038018," dated Dec. 17, 2019, with English translation thereof, pp. 1-15.

"Office Action of Europe Counterpart Application", dated Jun. 3, 2022, p. 1-p. 4.

Office Action of Japan Counterpart Application, with English translation thereof, dated Jul. 8, 2022, pp. 1-10.

\* cited by examiner

FIG. 9

IMAGING DEVICE

CROSS-REFERENCE TO RELATED APPLICATIONS

The present application is a Continuation of PCT International Application No. PCT/JP2019/038018 filed on Sep. 26, 2019 claiming priority under 35 U.S.C § 119(a) to Japanese Patent Application No. 2018-188418 filed on Oct. 3, 2018. Each of the above applications is hereby expressly incorporated by reference, in its entirety, into the present application.

BACKGROUND OF THE INVENTION

1. Field of the Invention

The present invention relates to an imaging device, and more particularly, to an imaging device that independently acquires three images with one imaging element.

2. Description of the Related Art

JP2009-169096A discloses an imaging device in which a pupil region of an optical system is divided into two regions and light transmitted through each region is separated by a polarizer and an analyzer and is received by different pixels, which makes it possible to independently acquire two images with one imaging element. However, the number of images that can be acquired by the imaging device disclosed in JP2009-169096A is limited to two.

On the other hand, WO2012/143983A discloses an imaging device in which a pupil portion of an optical system is divided into two or more regions and light from each region is guided to different pixels by a microlens array, which makes it possible to independently acquire two or more images with one imaging element.

However, the separation of beams by the microlens array is not always perfect. Therefore, the imaging device disclosed in WO2012/143983A has a problem that light leaks to adjacent pixels and crosstalk occurs.

In order to solve this problem, WO2015/004886A proposes a technique that performs predetermined signal processing on a signal (pixel signal) obtained from each pixel to remove the influence of crosstalk.

SUMMARY OF THE INVENTION

However, the amount of crosstalk occurring in each pixel in a case in which beams are separated by the microlens array varies depending on the position of the pixels. Therefore, in the imaging device disclosed in WO2015/004886, it is necessary to calculate the amount of crosstalk occurring in each pixel in order to obtain a higher-quality image. However, this requires a great deal of effort.

The invention has been made in view of the above-mentioned problems, and an object of the invention is to provide an imaging device that can acquire three independent high-quality images using one imaging element.

(1) There is provided an imaging device comprising: an optical system including three optical regions that transmit light in different polarization directions; an imaging element including a plurality of pixel units each of which is a set of N pixels that receive light in different polarization directions, where N is an integer satisfying N≥3; a storage unit that stores a coefficient group configured by a matrix A of 3 rows and N columns in which each element is represented by aij, where i is an integer satisfying 1≤i≤3 and j is an integer satisfying 1≤j≤N; and an arithmetic unit that acquires the coefficient group from the storage unit and calculates three pixel signals X1, X2, and X3 corresponding to each of the optical regions of the optical system from N pixel signals x1, x2, ..., xN obtained from each of the pixel units of the imaging element using the following expression.

$$\begin{bmatrix} X1 \\ X2 \\ X3 \end{bmatrix} = \begin{bmatrix} a11 & a12 & \cdots & a1N \\ a21 & a22 & \cdots & a2N \\ a31 & a32 & \cdots & a3N \end{bmatrix} * \begin{bmatrix} x1 \\ x2 \\ \vdots \\ xN \end{bmatrix}$$

According to this aspect, predetermined arithmetic processing is performed on the N pixel signals x1, x2, ..., xN obtained from each pixel unit of the imaging element to obtain the pixel signals X1, X2, and X3 corresponding to each optical region of the optical system. Therefore, it is possible to acquire three independent high-quality images using one imaging element.

(2) In the imaging device according to (1), the matrix A may be acquired by calculating an inverse matrix of a matrix that has, as an element, a ratio at which light incident on each of the optical regions of the optical system is received by each of the pixels of each of the pixel units of the imaging element.

According to this aspect, an inverse matrix $B^{-1}$ of a matrix B having, as an element, the ratio at which the light incident on each optical region of the optical system is received by each pixel of each pixel unit of the imaging element is calculated to acquire each element of the matrix A.

(3) In the imaging device according to (2), the ratio at which the light incident on each of the optical regions of the optical system is received by each of the pixels of each of the pixel units of the imaging element may be acquired by calculating a square of a cosine of an angular difference between the polarization direction of light transmitted through each of the optical regions of the optical system and the polarization direction of light received by each of the pixels of each of the pixel units of the imaging element.

According to this aspect, the square of the cosine of the angular difference between the polarization direction of the light transmitted through each optical region of the optical system and the polarization direction of the light received by each pixel of each pixel unit of the imaging element is calculated to calculate each element of the matrix B.

(4) In the imaging device according to any one of (1) to (3), the imaging element may include a plurality of the pixel units each of which is a set of three pixels that receive light in different polarization directions.

According to this aspect, one pixel unit is composed of three pixels whose number is equal to the number of divisions of the optical region.

(5) In the imaging device according to any one of (1) to (3), a combination of the polarization directions of the light transmitted through each of the optical regions of the optical system may be the same as a combination of the polarization directions of the light received by each of the pixels of each of the pixel units of the imaging element.

According to this aspect, the combination of the polarization directions of the light transmitted through each optical region of the optical system and the combination of the polarization directions of the light received by each pixel of each pixel unit of the imaging element have the same setting. Therefore, it is possible to simplify the arithmetic processing in a case in which each element of the matrix A is calculated.

(6) In the imaging device according to any one of (1) to (5), the optical system may include three polarization filters having different polarization directions which are provided at a pupil position.

According to this aspect, three polarization filters having different polarization directions are provided at the pupil position.

(7) In the imaging device according to any one of (1) to (6), the optical regions of the optical system may have different focal lengths.

According to this aspect, the optical regions of the optical system have different focal lengths.

(8) In the imaging device according to any one of (1) to (6), the optical regions of the optical system may focus on objects at different distances.

According to this aspect, the optical regions of the optical system focus on the objects at different distances.

(9) In the imaging device according to any one of (1) to (6), the optical regions of the optical system may transmit light in different wavelength bands.

According to this aspect, the optical regions of the optical system transmit light in different wavelength bands.

(10) In the imaging device according to any one of (1) to (6), the optical regions of the optical system may have parallax therebetween.

According to this aspect, the optical regions of the optical system have parallax therebetween.

(11) In the imaging device according to any one of (1) to (6), at least two of the optical regions of the optical system may have parallax.

According to this aspect, at least two of the three optical regions of the optical system have parallax. For example, the two optical regions are set to the same focal length and have horizontal parallax.

(12) In the imaging device according to any one of (1) to (11), the imaging element may include a polarization element that is provided in each of the pixels.

According to this aspect, the polarization element is comprised in each pixel.

(13) In the imaging device according to (12), in the imaging element, the polarization element may be provided between a photodiode and a microlens which constitute each of the pixels.

According to this aspect, the polarization element is provided between the photodiode and the microlens constituting each pixel.

According to the invention, it is possible to independently acquire three high-quality images with one imaging element.

BRIEF DESCRIPTION OF THE DRAWINGS

FIG. 9 is a diagram illustrating an example of the arrangement of the pixels in the imaging element.

DESCRIPTION OF THE PREFERRED EMBODIMENTS

Hereinafter, preferred embodiments of the invention will be described in detail with reference to the accompanying drawings.

First Embodiment

Figure 1:
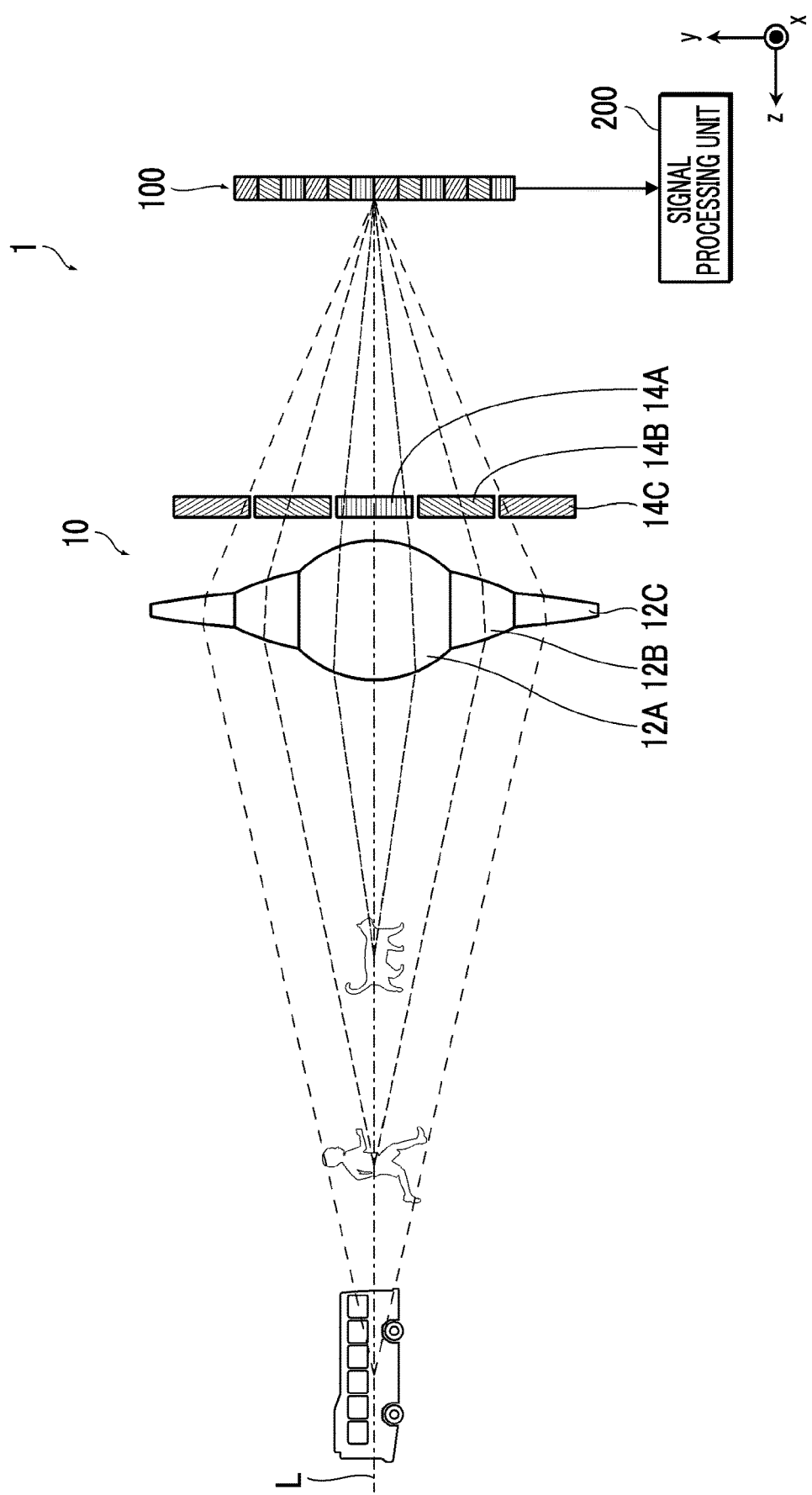
FIG. 1 is a diagram illustrating a schematic configuration of an imaging device according to a first embodiment.

FIG. 1 is a diagram illustrating a schematic configuration of an imaging device according to a first embodiment.

As illustrated in FIG. 1, an imaging device 1 according to this embodiment comprises an optical system 10, an imaging element 100, and a signal processing unit 200.

[Optical System]

Figure 2:
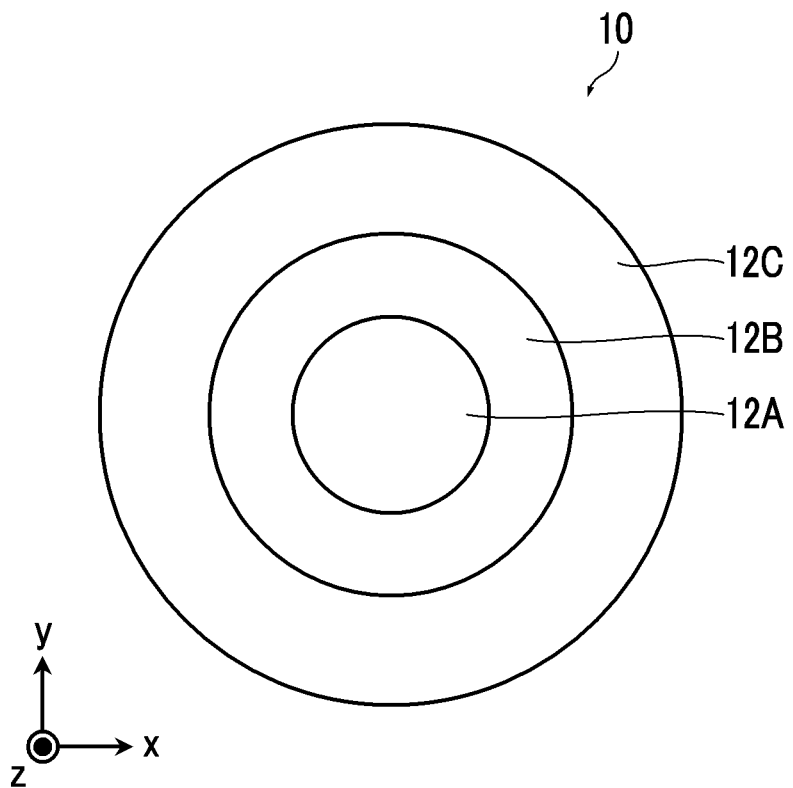
FIG. 2 is a front view illustrating a schematic configuration of an optical system.

FIG. 2 is a front view illustrating a schematic configuration of the optical system.

As illustrated in FIGS. 1 and 2, the optical system 10 has three optical regions 12A, 12B, and 12C provided in a concentric circle shape. It is assumed that the central optical region 12A is a first optical region 12A, the intermediate optical region 12B is a second optical region 12B, and the outermost optical region 12C is a third optical region 12C. The optical regions 12A, 12B, and 12C have different optical characteristics. In this embodiment, the optical regions 12A, 12B, and 12C are configured to focus on objects at different distances. Specifically, the first optical region 12A is configured to focus on a short-distance object, the second optical region 12B is configured to focus on a medium-distance object, and the third optical region 12C is configured to focus on a long-distance object. In addition, here, the short distance, the medium distance, and the long distance are relatively distinguished. That is, the second optical region 12B is configured to focus on an object at a longer distance farther than the first optical region 12A, and the third optical region 12C is configured to focus on an object at a longer distance than the second optical region 12B.

As illustrated in FIG. 1, polarization filters 14A, 14B, and 14C are individually comprised in the optical regions 12A, 12B, and 12C, respectively. Each of the polarization filters 14A, 14B, and 14C is provided at or near the pupil position of the optical system 10. It is assumed that the polarization filter 14A comprised in the first optical region 12A is a first polarization filter 14A, the polarization filter 14B comprised in the second optical region 12B is a second polarization filter 14B, and the polarization filter 14C comprised in the third optical region 12C is a third polarization filter 14C. The polarization filters 14A, 14B, and 14C have different polarization directions.

Figure 3:
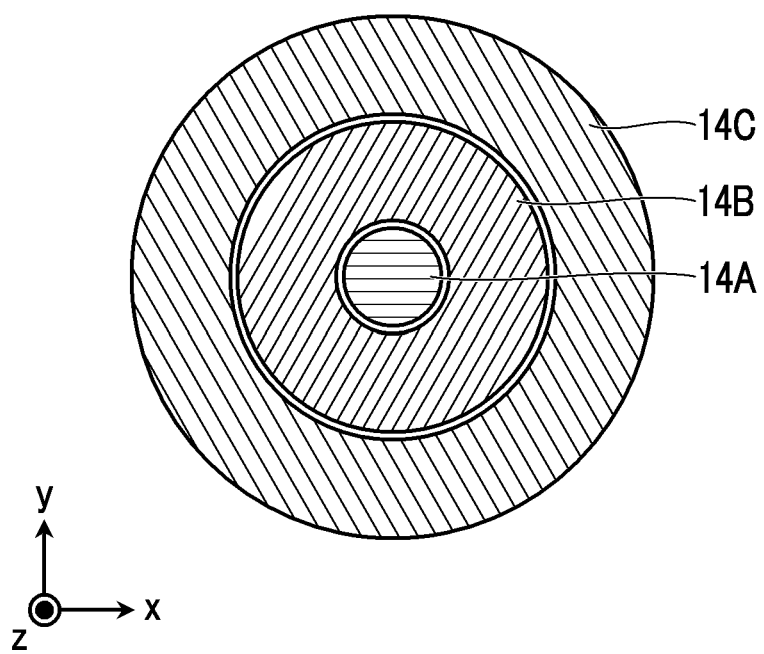
FIG. 3 is a front view illustrating a schematic configuration of a polarization filter comprised in each optical region.

FIG. 3 is a front view illustrating a schematic configuration of the polarization filter comprised in each optical region.

The polarization filters 14A, 14B, and 14C are disposed in a concentric circle shape. The first polarization filter 14A has a circular shape corresponding to the first optical region 12A and transmits light incident on the first optical region 12A. The second polarization filter 14B has a ring shape corresponding to the second optical region 12B and transmits light incident on the second optical region 12B. The third polarization filter 14C has a ring shape corresponding to the third optical region 12C and transmits light incident on the third optical region 12C.

Figure 4:
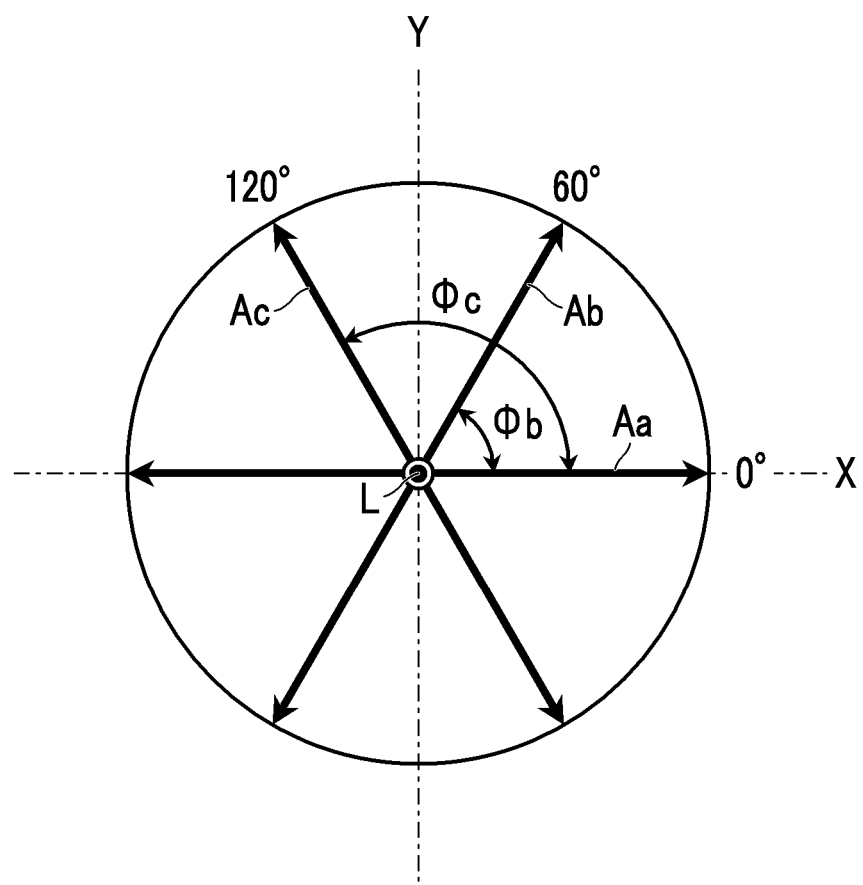
FIG. 4 is a diagram illustrating an example of a polarization direction set in each polarization filter.

FIG. 4 is a diagram illustrating an example of the polarization direction set for each polarization filter.

The polarization direction is represented by an angle Φ (azimuth angle) formed between a polarization transmission axis and the X-axis in the XY plane orthogonal to an optical axis L. As illustrated in FIG. 4, the first polarization filter 14A is configured to transmit light having an angle Φa of 0° (azimuth angle 0°) formed between a polarization transmission axis Aa and the X-axis. The second polarization filter 14B is configured to transmit light having an angle Φb of 60° (azimuth angle 60°) formed between a polarization transmission axis Ab and the X-axis. The third polarization filter 14C is configured to transmit light having an angle Φc of 120° (azimuth angle 120°) formed between a polarization transmission axis Ac and the X-axis. As a result, in the optical system 10 according to this embodiment, light (linear polarized light) having an azimuth angle of 0° is emitted from the first optical region 12A, light (linear polarized light) having an azimuth angle of 60° is emitted from the second optical region 12B, and light (linear polarized light) having an azimuth angle of 120° is emitted from the third optical region 12C.

The entire optical system 10 is provided so as to be movable back and forth along the optical axis L. Therefore, focus is adjusted. In addition, each optical region may be movable.

[Imaging Element]

Figure 5:
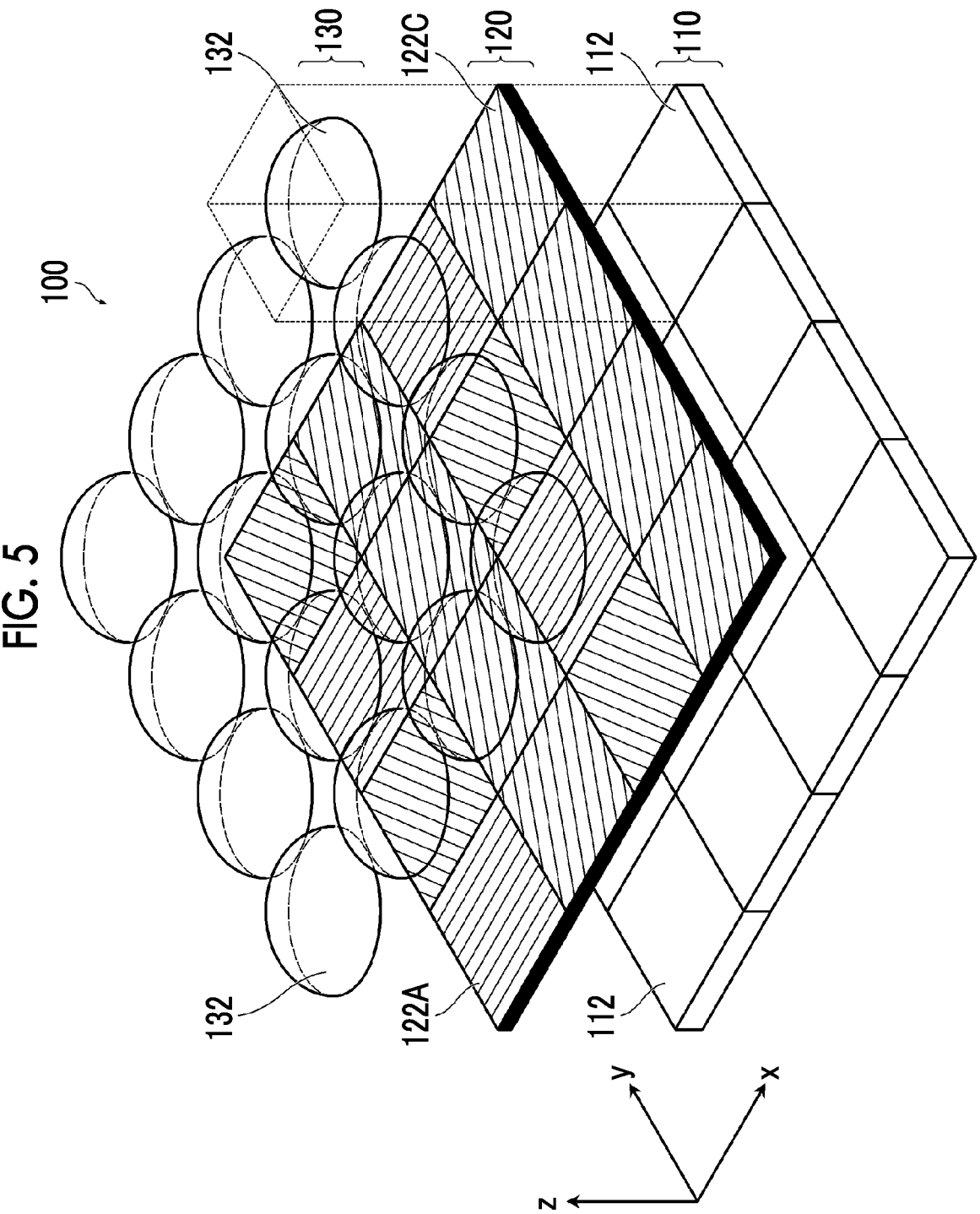
FIG. 5 is a diagram illustrating a schematic configuration of an imaging element.
Figure 6:
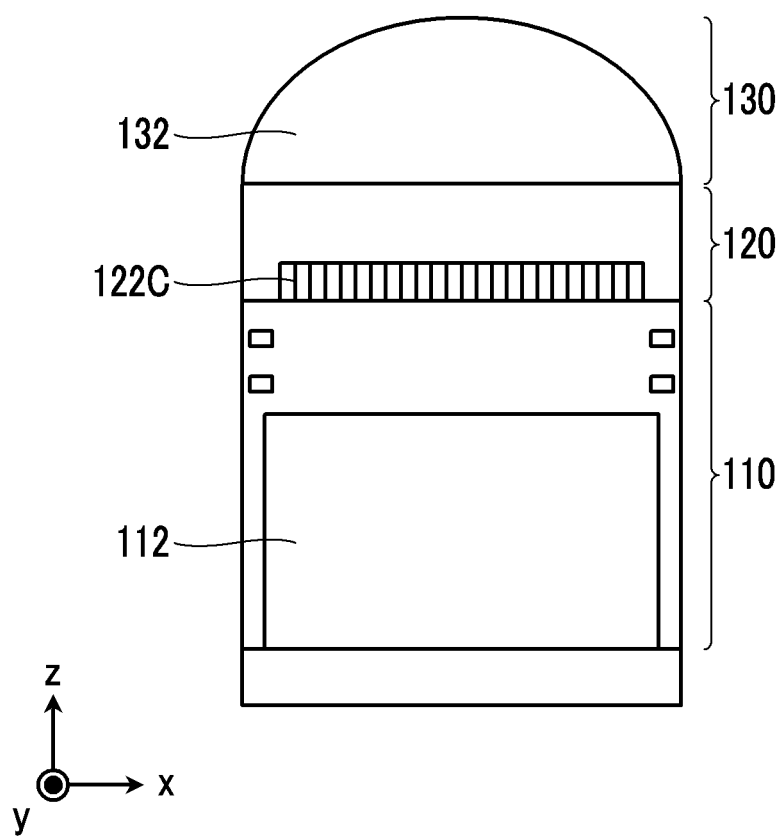
FIG. 6 is a cross-sectional view illustrating a schematic configuration of one pixel (a portion represented by a dashed line in FIG. 5).

FIG. 5 is a diagram illustrating a schematic configuration of the imaging element and is an exploded and enlarged view of a portion of the imaging element. FIG. 6 is a cross-sectional view illustrating a schematic configuration of one pixel (a portion represented by a dashed line in FIG. 5).

As illustrated in FIG. 5, the imaging element 100 has a pixel array layer 110, a polarization element array layer 120, and a microlens array layer 130.

The pixel array layer 110 is configured by two-dimensionally arranging a large number of photodiodes 112. One photodiode 112 constitutes one pixel. The photodiodes 112 are regularly arranged along the x-axis direction and the y-axis direction.

The polarization element array layer 120 is provided between the pixel array layer 110 and the microlens array layer 130. The polarization element array layer 120 is configured by two-dimensionally arranging three types of polarization elements 122A, 122B, and 122C having different polarization directions (the directions of polarization transmission axes). It is assumed that the polarization element 122A which transmits light in a first polarization direction is a first polarization element 122A, the polarization element 122B which transmits light in a second polarization direction is a second polarization element 122B, and the polarization element 122C which transmits light in a third polarization direction is a third polarization element 122C. Each of the polarization elements 122A, 122B, and 122C is disposed at the same interval as the photodiodes 112 and is comprised in each pixel. Therefore, one photodiode 112 comprises any one of three types of polarization elements 122A, 122B, and 122C.

Figure 7:
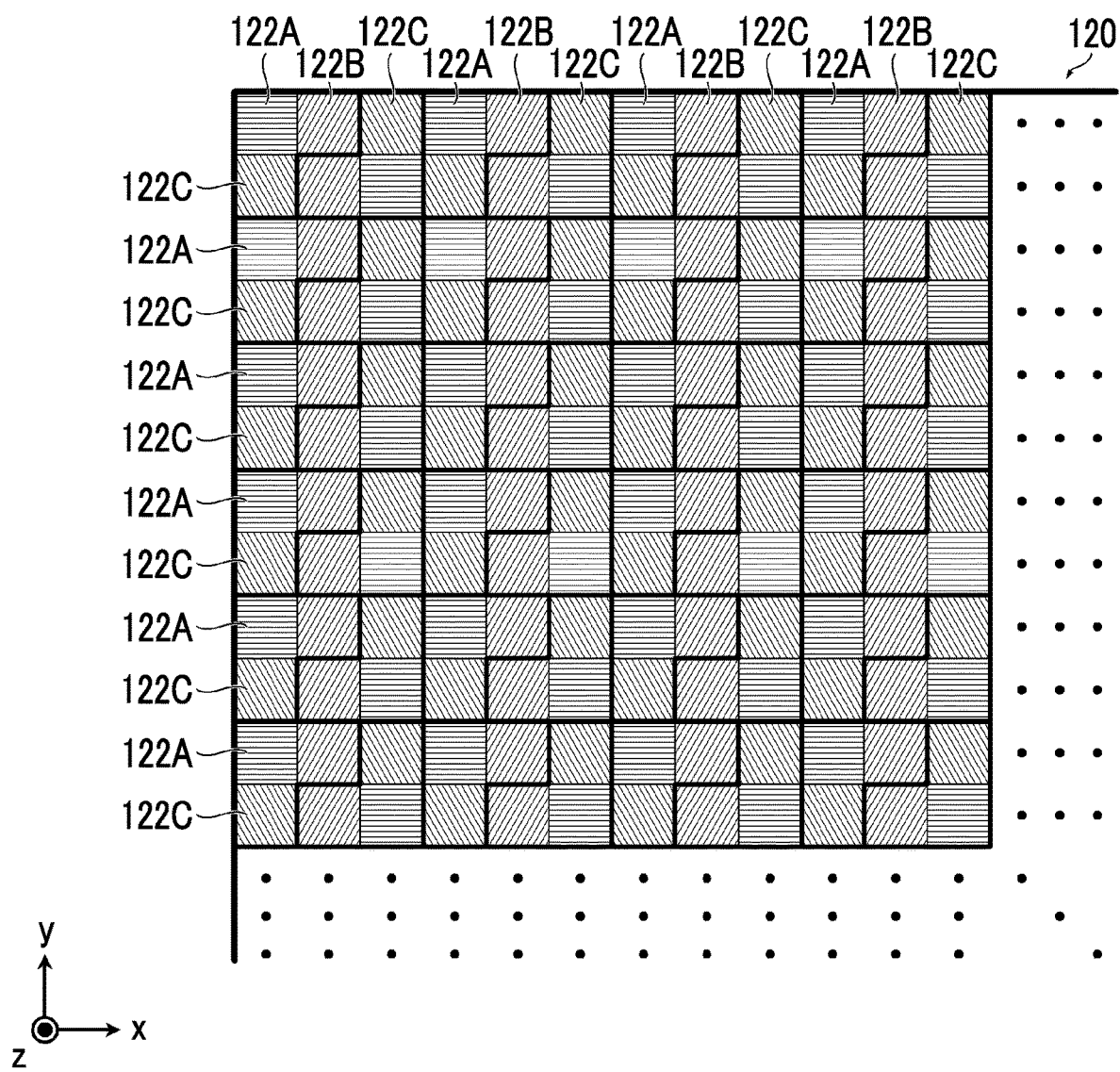
FIG. 7 is a diagram illustrating an example of an arrangement pattern of three types of polarization elements.

FIG. 7 is a diagram illustrating an example of the arrangement pattern of three types of polarization elements.

As illustrated in FIG. 7, the three types of polarization elements 122A, 122B, and 122C are regularly arranged in a predetermined order along the x-axis direction and the y-axis direction.

In the example illustrated in FIG. 7, the three types of polarization elements 122A, 122B, and 122C are regularly arranged in a predetermined pattern by alternately arranging a row in which the first polarization element 122A, the second polarization element 122B, and the third polarization element 122C are repeatedly arranged in this order and a row in which the third polarization element 122C, the second polarization element 122B, and the first polarization element 122A are repeatedly arranged in this order. For the polarization elements 122A, 122B, and 122C arranged in this way, a set of three types of polarization elements including one polarization element 122A, one polarization element 122B, and one polarization element 122C constitutes one unit, and the units are regularly arranged along the x-axis direction and the y-axis direction.

Figure 8:
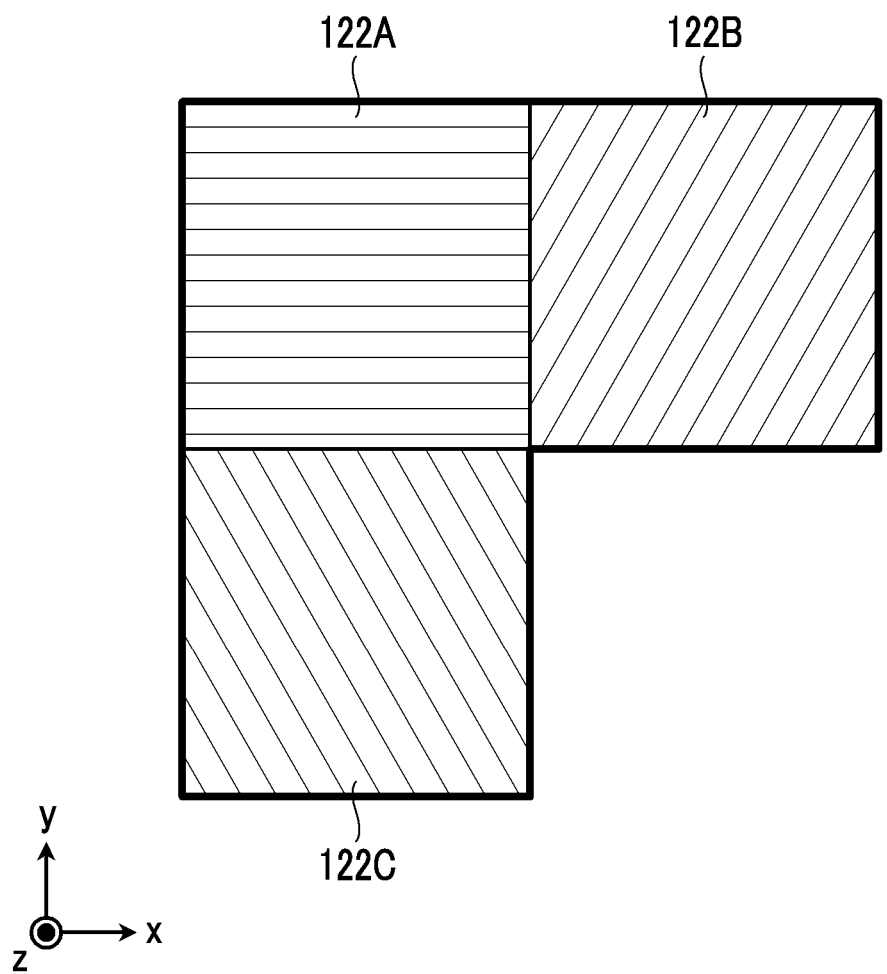
FIG. 8 is a diagram illustrating a configuration of one unit of a polarization element.

FIG. 8 is a diagram illustrating the configuration of one unit of the polarization elements.

As illustrated in FIG. 8, one unit includes one first polarization element 122A, one second polarization element 122B, and one third polarization element 122C.

As described above, the polarization elements 122A, 122B, and 122C have different polarization directions. In this embodiment, the first polarization element 122A is configured to transmit light having an azimuth angle of 0°. The second polarization element 122B is configured to transmit light having an azimuth angle of 60°. The third polarization element 122C is configured to transmit light having an azimuth angle of 120°. Therefore, the photodiode 112 comprising the first polarization element 122A receives the light (linearly polarized light) having an azimuth angle of 0°. The photodiode 112 comprising the second polarization element 122B receives the light (linearly polarized light) having an azimuth angle of 60°. The photodiode 112 comprising the third polarization element 122C receives the light (linearly polarized light) having an azimuth angle of 120°.

The microlens array layer 130 is configured by two-dimensionally arranging a large number of microlenses 132. Each of the microlenses 132 is disposed at the same interval as the photodiodes 112 and is comprised in each pixel. The microlens 132 is comprised in order to efficiently focus light from the optical system 10 on the photodiode 112.

Figure 9:
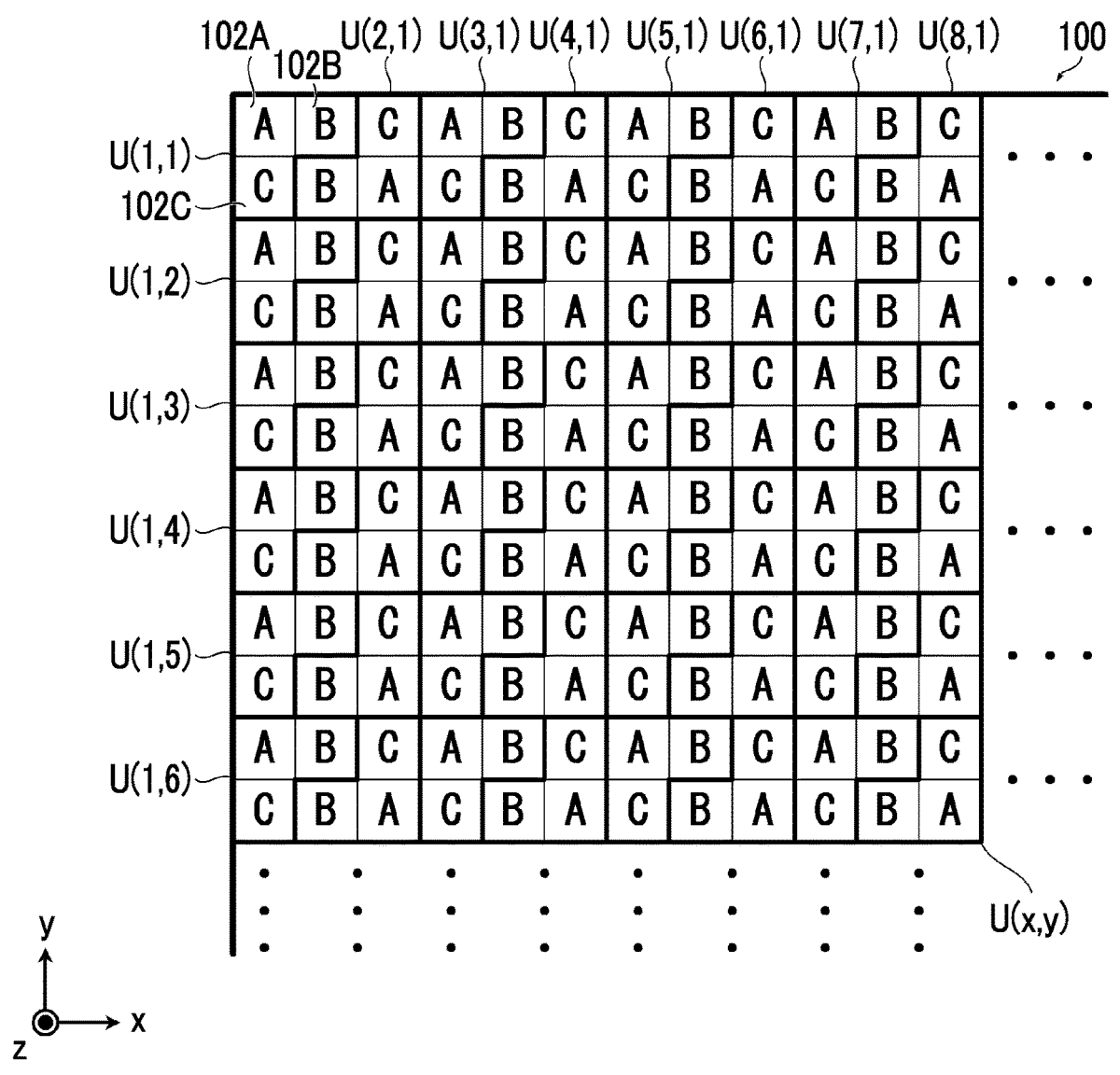

FIG. 9 is a diagram illustrating an example of the arrangement of the pixels in the imaging element.

Each pixel comprises any one of the first polarization element 122A, the second polarization element 122B, or the third polarization element 122C. It is assumed that the pixel (the image of A in FIG. 9) comprising the first polarization element 122A is a first pixel 102A, the pixel (the image of B in FIG. 9) comprising the second polarization element 122B is a second pixel 102B, and the pixel (the image of C in FIG. 9) comprising the third polarization element 122C is a third pixel 102C. The imaging element 100 has a plurality of units each of which is a set of three pixels including one first pixel 102A, one second pixel 102B, and one third pixel 102C. The unit which is a set of three pixels is referred to as a pixel unit U(x, y). As illustrated in FIG. 9, the pixel units U(x, y) are regularly arranged along the x-axis direction and the y-axis direction.

Since the first pixel 102A comprises the first polarization element 122A, it receives the light (linearly polarized light) having an azimuth angle of 0°. Therefore, the first pixel 102A mainly receives light from the first optical region 12A and partially receives light from the second optical region 12B and the third optical region 12C.

Since the second pixel 102B comprises the second polarization element 122B, it receives the light (linearly polarized light) having an azimuth angle of 60°. Therefore, the second pixel 102B mainly receives light from the second optical region 12B and partially receives light from the first optical region 12A and the third optical region 12C.

Since the third pixel 102C comprises the third polarization element 122C, it receives the light (linearly polarized light) having an azimuth angle of 120°. Therefore, the third pixel 102C mainly receives light from the third optical region 12C and partially receives light from the first optical region 12A and the second optical region 12B.

[Signal Processing Unit]

The signal processing unit 200 processes the signal output from the imaging element 100 to generate image data acquired by each of the optical regions 12A, 12B, and 12C of the optical system 10.

Figure 10:
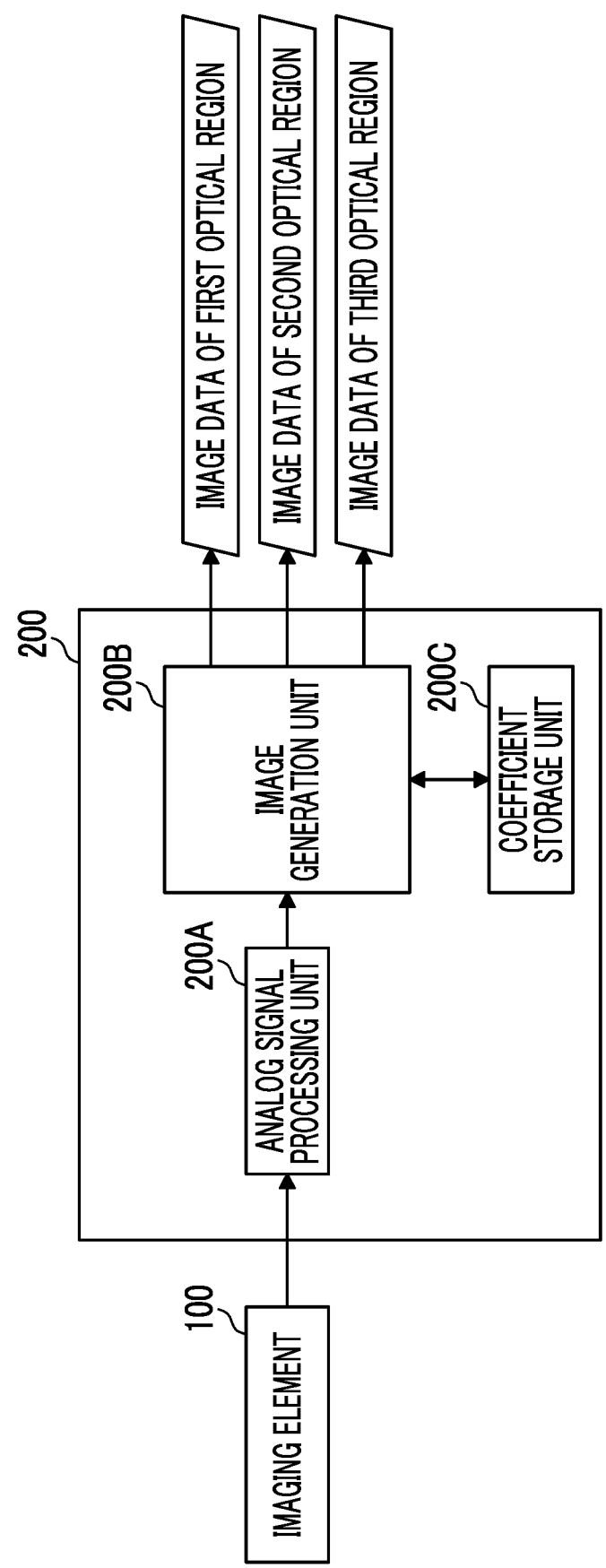
FIG. 10 is a block diagram illustrating a schematic configuration of a signal processing unit.

FIG. 10 is a block diagram illustrating a schematic configuration of the signal processing unit.

Figure 13:
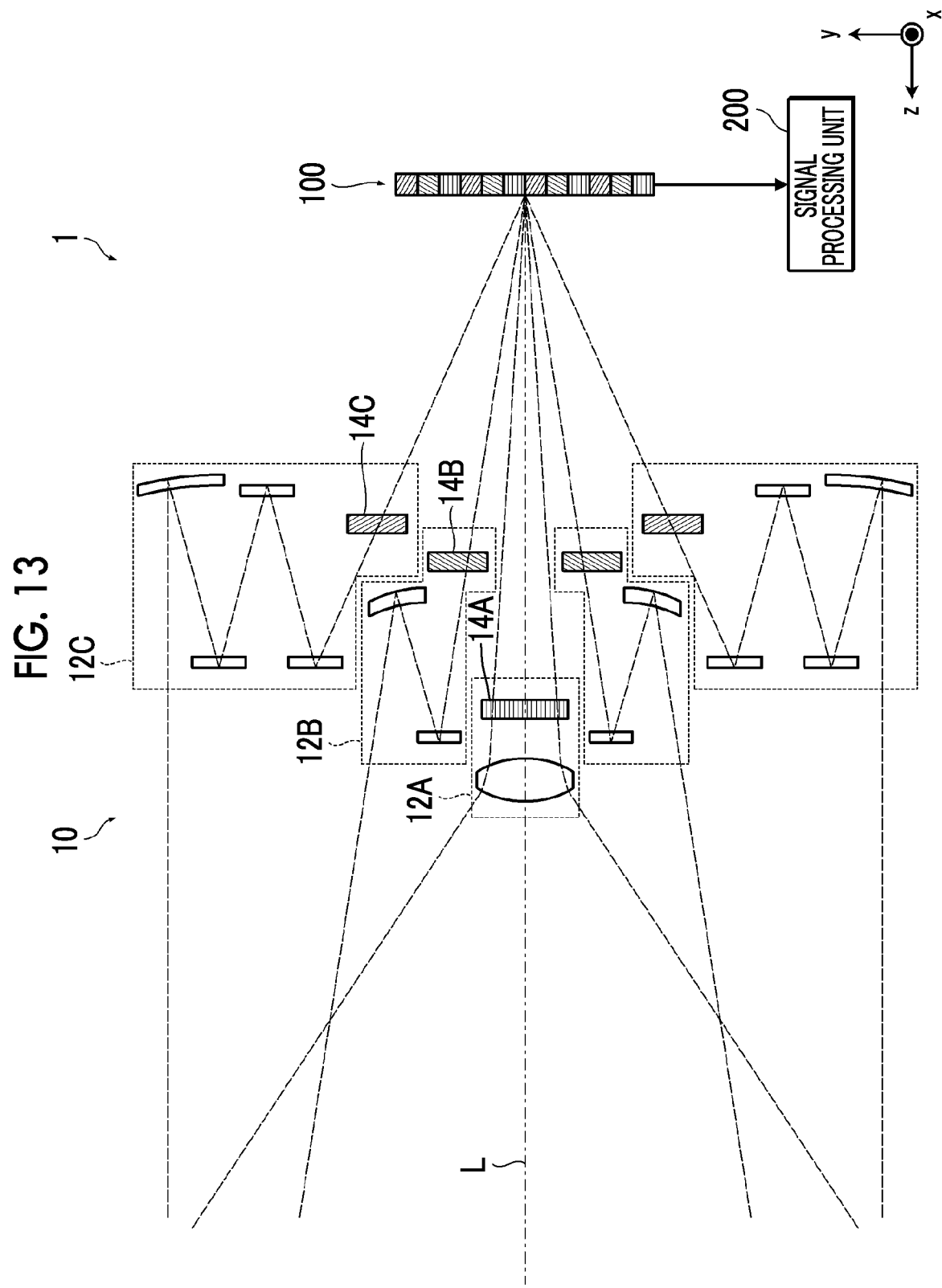
FIG. 13 is a diagram illustrating a schematic configuration of an imaging device according to a second embodiment.

As illustrated in FIG. 13, the signal processing unit 200 includes an analog signal processing unit 200A, an image generation unit 200B, and a coefficient storage unit 200C.

The analog signal processing unit 200A acquires an analog pixel signal output from each pixel of the imaging element 100, performs predetermined signal processing (for example, a correlated double sampling process or an amplification process), converts the analog pixel signal into a digital signal, and outputs the digital signal.

The image generation unit 200B performs predetermined signal processing on the pixel signal converted into the digital signal to generate image data corresponding to each of the optical regions 12A, 12B, and 12C. That is, the images acquired by each of the optical regions 12A, 12B, and 12C are generated.

Figure 11:
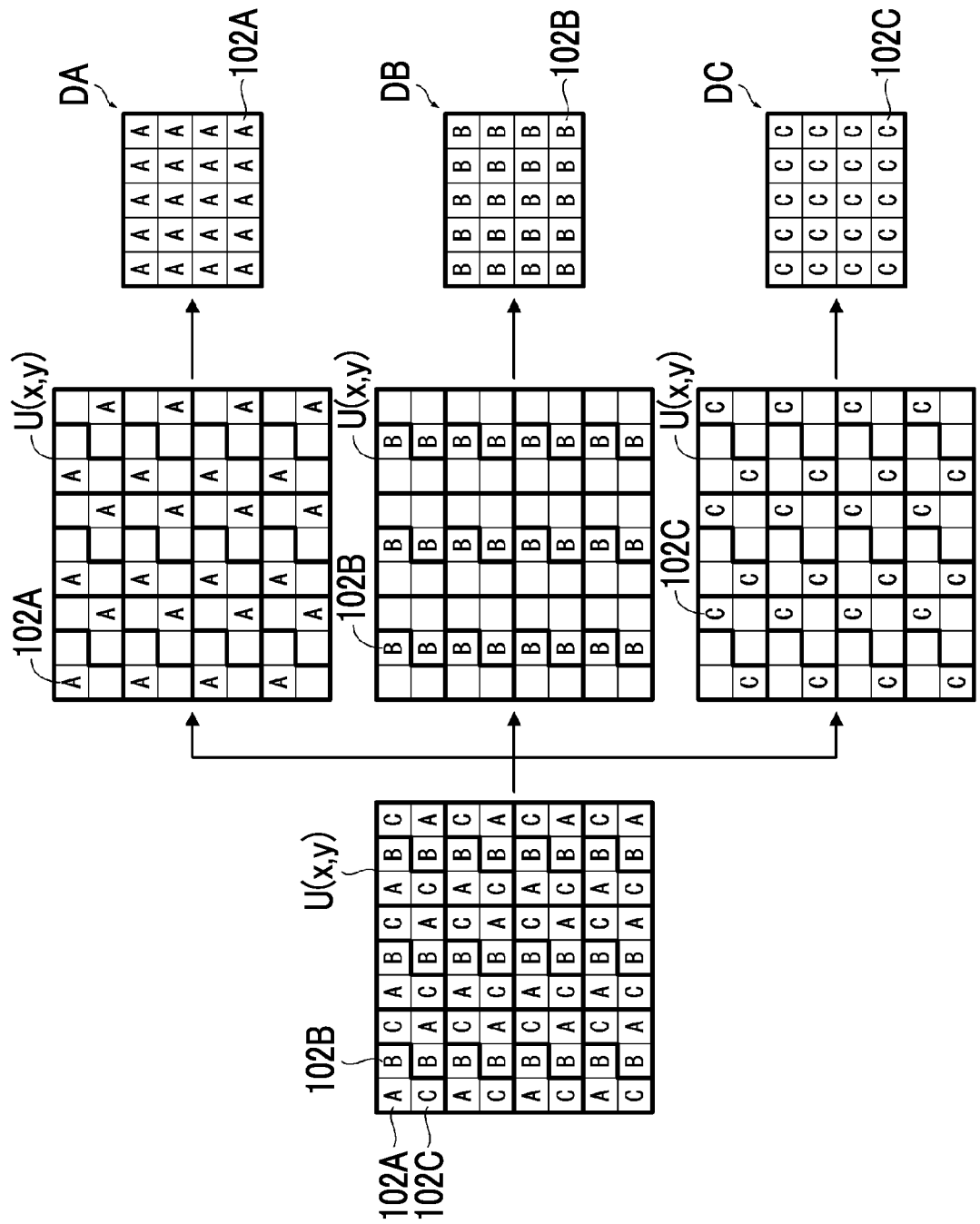
FIG. 11 is a conceptual diagram illustrating image generation.

FIG. 11 is a conceptual diagram illustrating image generation.

Each pixel unit U(x, y) includes one first pixel 102A, one second pixel 102B, and one third pixel 102C. Therefore, three image data items are generated by separating and extracting the pixel signals of the first pixel 102A, the second pixel 102B, and the third pixel 102C from each pixel unit U(x, y). That is, first image data DA configured by extracting a pixel signal from the first pixel 102A of each pixel unit U(x, y), second image data DB configured by extracting a pixel signal from the second pixel 102B of each pixel unit U(x, y), and third image data DC configured by extracting a pixel signal from the third pixel 102C of each pixel unit U(x, y) are generated.

However, as described above, the light received by the first pixel 102A is mainly light from the first optical region 12A and partially includes light from the second optical region 12B and the third optical region 12C. Therefore, the image represented by the first image data DA is mainly the image acquired by the first optical region 12A and has the images acquired by the second optical region 12B and the third optical region 12C mixed therein. That is, in the image represented by the first image data DA, the images acquired by the second optical region 12B and the third optical region 12C appear faintly. Similarly, in the image represented by the second image data DB, the images acquired by the first optical region 12A and the third optical region 12C are mixed with the image acquired by the second optical region 12B. In the image represented by the third image data DC, the images acquired by the first optical region 12A and the second optical region 12B are mixed with the image acquired by the third optical region 12C.

Therefore, the image generation unit 200B performs a crosstalk removal process to generate images acquired in each of the optical regions 12A, 12B, and 12C. Crosstalk is removed as follows.

Here, it is assumed that the pixel signal (signal value) obtained by the first pixel 102A is x1, the pixel signal obtained by the second pixel 102B is x2, and the pixel signal obtained by the third pixel 102C is x3. Three pixel signals x1, x2, and x3 are obtained from each pixel unit U(x, y). The image generation unit 200B calculates pixel signals X1, X2, and X3 respectively corresponding to the optical regions 12A, 12B, and 12C, that is, the pixel signals X1, X2, and X3 of the images obtained by each of the optical regions 12A, 12B, and 12C from the three pixel signals x1, x2, and x3 with the following Expression 1 using the matrix A to remove crosstalk.

$$A = \begin{bmatrix} a11 & a12 & a13 \\ a21 & a22 & a23 \\ a31 & a32 & a33 \end{bmatrix}$$

$$\begin{bmatrix} X1 \\ X2 \\ X3 \end{bmatrix} = \begin{bmatrix} a11 & a12 & a13 \\ a21 & a22 & a23 \\ a31 & a32 & a33 \end{bmatrix} * \begin{bmatrix} x1 \\ x2 \\ x3 \end{bmatrix} \quad \text{(Expression 1)}$$

Hereinafter, the reason why the pixel signals X1, X2, and X3 of the images obtained by each of the optical regions 12A, 12B, and 12C can be calculated by Expression 1, that is, the reason why crosstalk can be removed will be described.

Crosstalk occurs due to the mixture of light from each of the optical regions 12A, 12B, and 12C into each of the pixels 102A, 102B, and 102C. The ratio (the amount of crosstalk (also referred to as a crosstalk ratio)) at which light incident on each of the optical regions 12A, 12B, and 12C is received by each of the pixels 102A, 102B, and 102C is uniquely determined from the relationship between the polarization directions of the polarization filters 14A, 14B, and 14C respectively comprised in the optical regions 12A, 12B, and 12C and the polarization directions of the polarization elements 122A, 122B, and 122C respectively comprised in the pixels 102A, 102B, and 102C.

Here, assuming that the ratio (the amount of crosstalk) at which the light incident on the first optical region 12A is received by the first pixel 102A is b11, the ratio at which the light incident on the second optical region 12B is received by the first pixel 102A is b12, and the ratio at which the light incident on the third optical region 12C is received by the first pixel 102A is b13, the following relationship is established between x1 and X1, X2, and X3.

$$b11*X1+b12*X2+b13*X3=x1 \quad \text{(Expression 2)}$$

In addition, assuming that the ratio at which the light incident on the first optical region 12A is received by the second pixel 102B is b21, the ratio at which the light incident on the second optical region 12B is received by the second pixel 102B is b22, and the ratio at which the light incident on the third optical region 12C is received by the second pixel 102B is b23, the following relationship is established between x2 and X1, X2, and X3.

$$b21*X1+b22*X2+b23*X3=x2 \quad \text{(Expression 3)}$$

Further, assuming that the ratio at which the light incident on the first optical region 12A is received by the third pixel 102C is b31, the ratio at which the light incident on the second optical region 12B is received by the third pixel 102C is b32, and the ratio at which the light incident on the third optical region 12C is received by the third pixel 102C is b33, the following relationship is established between x3 and X1, X2, and X3.

$$b31*X1+b32*X2+b33*X3=x3 \quad \text{(Expression 4)}$$

For X1, X2, and X3, the simultaneous equations of Expressions 2 to 4 can be solved to acquire the pixel signal of the original image, that is, the pixel signals X1, X2, and X3 of the images obtained by each of the optical regions 12A, 12B, and 12C.

Here, the above-mentioned simultaneous equations can be represented by the following Expression 5 using the matrix B.

$$B = \begin{bmatrix} b11 & b12 & b13 \\ b21 & b22 & b23 \\ b31 & b32 & b33 \end{bmatrix}$$

$$\begin{bmatrix} b11 & b12 & b13 \\ b21 & b22 & b23 \\ b31 & b32 & b33 \end{bmatrix} * \begin{bmatrix} X1 \\ X2 \\ X3 \end{bmatrix} = \begin{bmatrix} x1 \\ x2 \\ x3 \end{bmatrix} \quad \text{(Expression 5)}$$

X1, X2, and X3 are calculated by multiplying both sides by the inverse matrix $B^{-1}$ of the matrix B.

$$\begin{bmatrix} b11 & b12 & b13 \\ b21 & b22 & b23 \\ b31 & b32 & b33 \end{bmatrix}^{-1} * \begin{bmatrix} b11 & b12 & b13 \\ b21 & b22 & b23 \\ b31 & b32 & b33 \end{bmatrix} * \begin{bmatrix} X1 \\ X2 \\ X3 \end{bmatrix} = \begin{bmatrix} b11 & b12 & b13 \\ b21 & b22 & b23 \\ b31 & b32 & b33 \end{bmatrix}^{-1} * \begin{bmatrix} x1 \\ x2 \\ x3 \end{bmatrix}$$

-continued $$\begin{bmatrix} X1 \\ X2 \\ X3 \end{bmatrix} = \begin{bmatrix} b11 & b12 & b13 \\ b21 & b22 & b23 \\ b31 & b32 & b33 \end{bmatrix}^{-1} * \begin{bmatrix} x1 \\ x2 \\ x3 \end{bmatrix}$$

As such, the pixel signals X1, X2, and X3 of the images obtained by each of the optical regions 12A, 12B, and 12C can be calculated from the pixel signals x1, x2, and x3 of the pixels 102A, 102B, and 102C on the basis of the ratio (the amount of crosstalk) at which the light incident on each of the optical regions 12A, 12B, and 12C is received by each of the pixels 102A, 102B, and 102C.

The matrix A in Expression 1 is the inverse matrix $B^{-1}$ of the matrix B ($A=B^{-1}$). Therefore, each element aij (i=1, 2, 3; j=1, 2, 3) of the matrix A can be acquired by calculating the inverse matrix $B^{-1}$ of the matrix B. Each element bij (i=1, 2, 3; j=1, 2, 3) of the matrix B is the ratio (the amount of crosstalk) at which the light incident on each of the optical regions 12A, 12B, and 12C is received by each of the pixels 102A, 102B, and 102C. That is, in the first row, the element b11 is the ratio (the amount of crosstalk) at which the light incident on the first optical region 12A is received by the first pixel 102A, the element b12 is the ratio at which the light incident on the second optical region 12B is received by the first pixel 102A, and the element b13 is the ratio at which the light incident on each of the third optical region 12C is received by the first pixel 102A. In addition, in the second row, the element b21 is the ratio at which the light incident on the first optical region 12A is received by the second pixel 102B, the element b22 is the ratio at which the light incident on the second optical region 12B is received by the second pixel 102B, and the element b23 is the ratio at which the light incident on each of the third optical region 12C is received by the second pixel 102B. Further, in the third row, the element b31 is the ratio at which the light incident on the first optical region 12A is received by the third pixel 102C, the element b32 is the ratio at which the light incident on the second optical region 12B is received by the third pixel 102C, and the element b33 is the ratio at which the light incident on each of the third optical region 12C is received by the third pixel 102C. That is, each element bij of the matrix B is the ratio at which the light incident on a j-th optical region is received by an i-th pixel. The inverse matrix $B^{-1}$ of the matrix B exists. Therefore, the calculation of the inverse matrix $B^{-1}$ of the matrix B makes it possible to calculate each element aij of the matrix A.

The ratio (the amount of crosstalk) at which the light incident on each of the optical regions 12A, 12B, and 12C is received by each of the pixels 102A, 102B, and 102C is calculated by the square of the cosine (cos) of an angular difference between the polarization direction of light passing through each of the optical regions 12A, 12B, and 12C and the polarization direction of light received by each of the pixels 102A, 102B, and 102C. Therefore, for example, assuming that the polarization direction (azimuth angle) of the light (linearly polarized light) that has passed through the j-th optical region is $\alpha j$ and the polarization direction (azimuth angle) of the light received by the i-th pixel is $\beta i$, the ratio (the amount of crosstalk) at which the light incident on the j-th optical region is received by the i-th pixel is calculated by $\cos^2(|\alpha j - \beta i|)$. Therefore, the elements bij can be calculated by $\cos^2(|\alpha j - \beta i|)$.

In the imaging device 1 according to this embodiment, the polarization direction (azimuth angle) of the light (linearly polarized light) passing through the first optical region 12A is 0°. The polarization direction of the light passing through the second optical region 12B is 60°. In addition, the polarization direction of the light passing through the third optical region 12C is 120°. Further, the polarization direction (azimuth angle) of the light (linearly polarized light) received by the first pixel 102A is 0°. Furthermore, the polarization direction of the light received by the second pixel 102B is 60°. Moreover, the polarization direction of the light received by the third pixel 102C is 120°.

Therefore, each element bij of the matrix B is as follows: b11=1; b12=0.25; b13=0.25; b21=0.25; b22=1; b23=0.025; b31=0.25; b32=0.25; and b33=1.

$$B = \begin{bmatrix} 1 & 0.25 & 0.25 \\ 0.25 & 1 & 0.25 \\ 0.25 & 0.25 & 1 \end{bmatrix}$$

The inverse matrix $B^{-1}$ of the matrix B exists, and each element aij is as follows: a11=1.1111; a12=−0.2222; a13=−0.2222; a21=−0.2222; a22=1.1111; a23=−0.2222; a31=−0.2222; a32=−0.2222; and a33=1.1111.

$$B^{-1} = \begin{bmatrix} 1.111 & -0.2222 & -0.2222 \\ -0.2222 & 1.1111 & -0.2222 \\ -0.2222 & -0.2222 & 1.1111 \end{bmatrix} = A$$

The coefficient storage unit 200C stores, as a coefficient group, each element aij of the matrix A of three rows and three columns calculated as the inverse matrix $B^{-1}$ of the matrix B. The coefficient storage unit 200C is an example of a storage unit.

The image generation unit 200B acquires the coefficient group from the coefficient storage unit 200C and calculates three pixel signals X1, X2, and X3 corresponding to each of the optical regions 12A, 12B, and 12C of the optical system 10 from three pixel signals x1, x2, and x3 obtained from each pixel unit U(x, y) using Expression 1 to generate image data of each of the optical regions 12A, 12B, and 12C. The image generation unit 200B is an example of an arithmetic unit.

The image data of each of the optical regions 12A, 12B, and 12C generated by the image generation unit 200B is output to the outside and is stored in a storage device as needed. In addition, the image data is displayed on a display (not illustrated) as needed.

Figure 12:
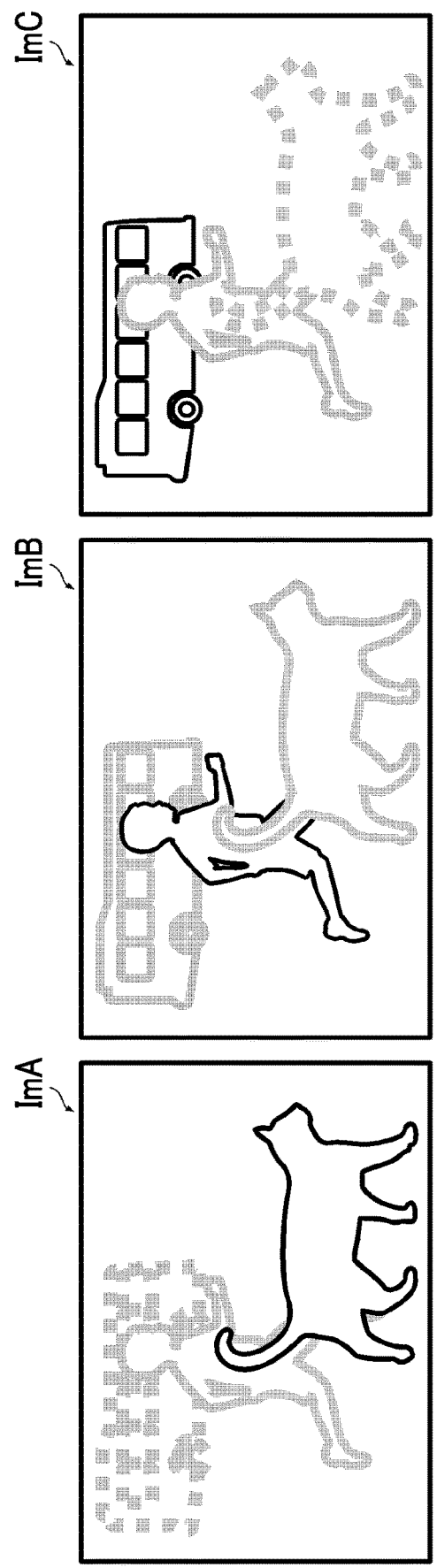
FIG. 12 is a diagram illustrating an example of images generated by an image generation unit.

FIG. 12 is a diagram illustrating an example of the images generated by the image generation unit.

An image ImA is obtained by the first optical region 12A. In the image ImA, a short-distance object (cat) is brought into focus, and a medium-distance object and a long-distance object are blurred (the amount of blurring of the medium-distance object (person) is medium, and the amount of blurring of the long-distance object (bus) is large).

An image ImB is obtained by the second optical region 12B. In the image ImB, the medium-distance object (person) is brought into focus, and the short-distance object and the long-distance object are blurred (the amounts of blurring of the short-distance object (cat) and the long-distance object (bus) are medium).

An image ImC is obtained by the third optical region 12C. In the image ImC, the long-distance object (bus) is brought into focus, and the short-distance object and the medium-distance object are blurred (the amount of blurring of the medium-distance object (person) is medium, and the amount of blurring of the short-distance object (cat) is large).

As illustrated in FIG. 12, all of the obtained images ImA, ImB, and ImC are clear images without crosstalk.

As such, according to the imaging device 1 of this embodiment, it is possible to acquire three independent high-quality images using one imaging element 100. In addition, this configuration can be achieved by a combination of the polarization filters 14A, 14B, and 14C respectively comprised in the optical regions 12A, 12B, and 12C of the optical system 10 and the polarization elements 122A, 122B, and 122C respectively comprised in the pixels 102A, 102B, and 102C of the imaging element 100. Therefore, it is possible to simplify the overall configuration.

Second Embodiment

FIG. 13 is a diagram illustrating a schematic configuration of an imaging device according to a second embodiment.

An imaging device 1 according to this embodiment is configured as a device that captures three images having different focal lengths. Therefore, the imaging device 1 differs from the imaging device 1 according to the first embodiment in the configuration of the optical system 10. Therefore, only the configuration of the optical system 10 will be described here.

[Optical System]

As illustrated in FIG. 13, the optical system has three optical regions 12A, 12B, and 12C having the same optical axis L. The focal lengths of the optical regions 12A, 12B, and 12C are different from each other. The central first optical region 12A is a wide-angle optical region and has a predetermined focal length. The intermediate second optical region 12B is a telephoto optical region and has a longer focal length than the first optical region 12A. The outermost third optical region 12C is a super-telephoto optical region and has a longer focal length than the second optical region 12B. In this embodiment, the second optical region 12B and the third optical region 12C are configured by a catadioptric system. Since the telephoto optical region is configured by the catadioptric system, it is possible to downsize the configuration of the optical system.

The polarization filters 14A, 14B, and 14C are individually comprised in the optical regions 12A, 12B, and 12C, respectively. It is assumed that the polarization filter 14A comprised in the first optical region 12A is a first polarization filter 14A, the polarization filter 14B comprised in the second optical region 12B is a second polarization filter 14B, and the polarization filter 14C comprised in the third optical region 12C is a third polarization filter 14C. The polarization filters 14A, 14B, and 14C have different polarization directions. In this embodiment, the first polarization filter 14A is configured to transmit light having an azimuth angle of 0°, the second polarization filter 14B is configured to transmit light having an azimuth angle of 60°, and the third polarization filter 14C is configured to transmit light having an azimuth angle of 120°. As a result, in the optical system 10 according to this embodiment, light (linear polarized light) having an azimuth angle of 0° is emitted from the first optical region 12A, light (linear polarized light) having an azimuth angle of 60° is emitted from the second optical region 12B, and light (linear polarized light) having an azimuth angle of 120° is emitted from the third optical region 12C.

The optical system 10 is configured such that the optical regions 12A, 12B, and 12C are individually moved back and forth along the optical axis L. Therefore, it is possible to individually adjust the focus of each of the optical regions 12A, 12B, and 12C. In addition, the entire optical system 10 may be moved back and forth along the optical axis L.

[Image Generation]

Similarly to the imaging device 1 according to the first embodiment, the pixel signals X1, X2, and X3 respectively corresponding to the optical regions 12A, 12B, and 12C are calculated from three pixel signals x1, x2, and x3 obtained from each pixel unit U(x, y) using Expression 1 to generate image data of each of the optical region 12A, 12B, and 12C.

Figure 14:
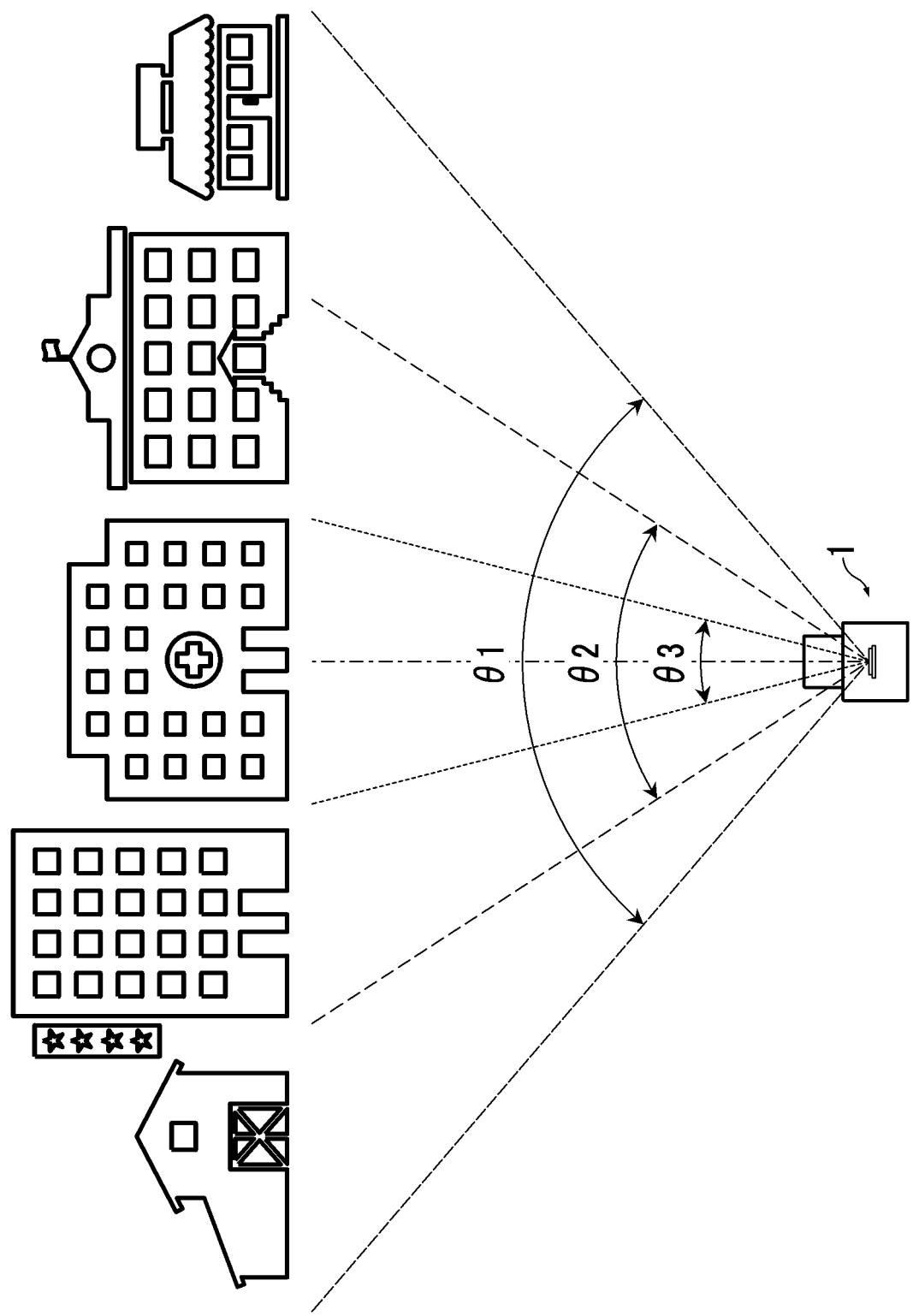
FIG. 14 is a diagram illustrating an example of an imaging situation.

FIG. 14 is a diagram illustrating an example of an imaging situation.

As illustrated in FIG. 14, the first optical region 12A captures an image of an object at an angle of view θ1. The second optical region 12B captures an image of an object at an angle of view θ2. The third optical region 12C captures an image of an object at an angle of view θ3.

Figure 15:
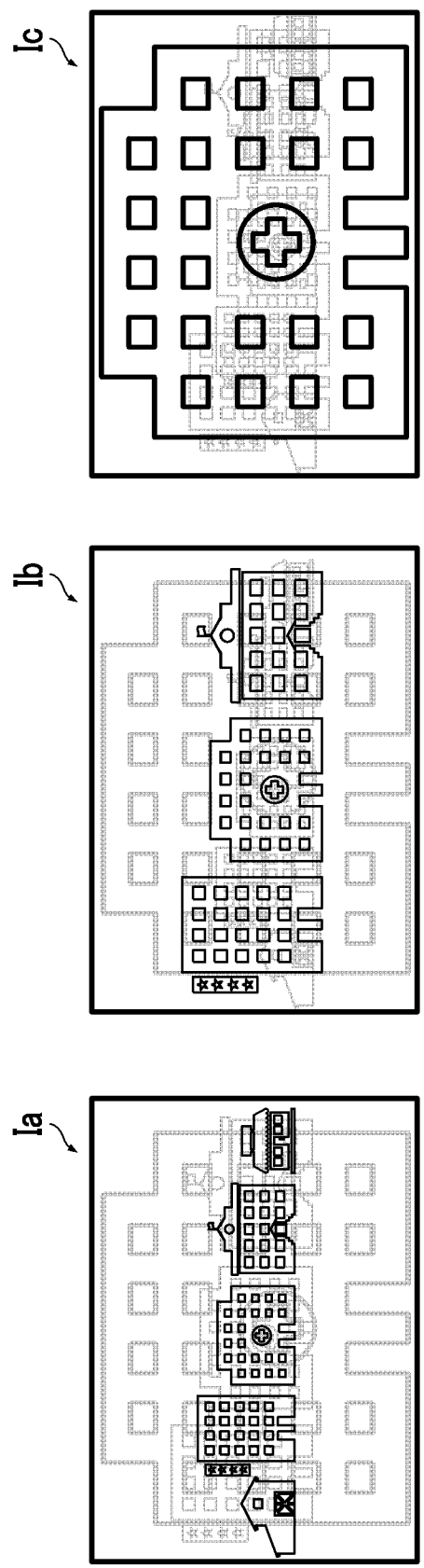
FIG. 15 is a diagram illustrating an example of the captured images (images before crosstalk removal).

FIG. 15 is a diagram illustrating an example of the captured images (images before crosstalk removal).

An image Ia is generated by extracting a pixel signal from the first pixel 102A of each pixel unit U(x, y). The image Ia is mainly a wide-angle image acquired by the first optical region 12A, and a telephoto image acquired by the second optical region 12B and a super-telephoto image acquired by the third optical region 12C are mixed in the image Ia (the telephoto image acquired by the second optical region 12B and the super-telephoto image acquired by the third optical region 12C appear faintly).

An image Ib is generated by extracting the pixel signal of the second pixel 102B of each pixel unit U(x, y). The image Ib is mainly the telephoto image acquired by the second optical region 12B, and the wide-angle image acquired by the first optical region 12A and the image acquired by the third optical region 12C are mixed in the image Ib (the wide-angle image acquired by the first optical region 12A and the image acquired by the third optical region 12C appear faintly).

An image Ic is generated by extracting a pixel signal from the third pixel 102C of each pixel unit U(x, y). The image Ic is mainly the super-telephoto image acquired by the third optical region 12C, and the wide-angle image acquired by the first optical region 12A and the telephoto image acquired by the second optical region 12B are mixed in the image Ic (the wide-angle image acquired by the first optical region 12A and the image acquired by the second optical region 12B appear faintly).

The image generation unit 200B of the signal processing unit 200 calculates the pixel signals X1, X2, and X3 respectively corresponding to the optical regions 12A, 12B, and 12C from three pixel signals x1, x2, and x3 obtained from each pixel unit U(x, y) using the following Expression 6 to remove crosstalk.

$$\begin{bmatrix} X1 \\ X2 \\ X3 \end{bmatrix} = \begin{bmatrix} 1.1111 & -0.2222 & -0.2222 \\ -0.2222 & 1.1111 & -0.2222 \\ -0.2222 & -0.2222 & 1.1111 \end{bmatrix} * \begin{bmatrix} x1 \\ x2 \\ x3 \end{bmatrix} \quad \text{(Expression 6)}$$

Figure 16:
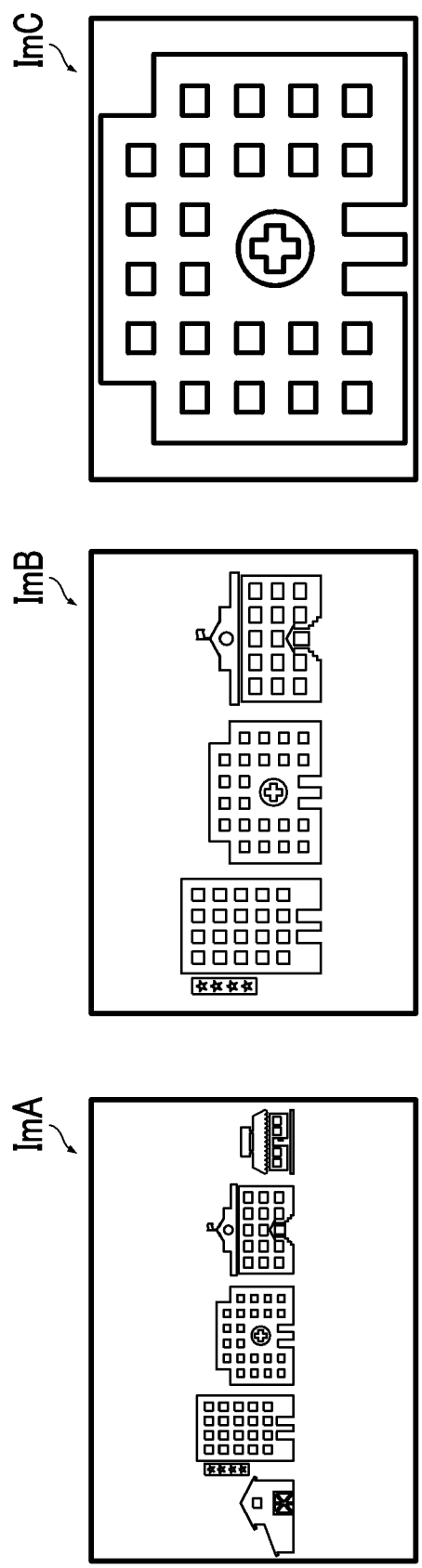
FIG. 16 is a diagram illustrating an example of the images after removing crosstalk.

FIG. 16 is a diagram illustrating an example of the images after crosstalk removal.

An image ImA is obtained by the first optical region 12A, and a wide-angle image is obtained. An image ImB is obtained by the second optical region 12B, and a telephoto image is obtained. An image ImC is obtained by the third optical region 12C, and a super-telephoto image is obtained. All of the obtained images ImA, ImB, and ImC are clear images without crosstalk.

As such, even in the imaging device 1 according to this embodiment, it is possible to acquire three independent high-quality images using one imaging element 100.

Third Embodiment

In the imaging devices 1 according to the first and second embodiments, a combination of the polarization directions (azimuth angles) of the polarization filters 14A, 14B, and 14C respectively comprised in the optical regions 12A, 12B, and 12C of the optical system 10 is 0°, 60°, and 120°, and a combination of the polarization directions (azimuth angles) of the polarization elements 122A, 122B, and 122C respectively comprised in the pixels 102A, 102B, and 102C of each pixel unit U(x, y) is 0°, 60°, and 120°. However, the combination of the polarization directions set in the polarization filters 14A, 14B, and 14C and the combination of the polarization directions set in the polarization elements 122A, 122B, and 122C are limited thereto. The combinations of the polarization directions may be different from each other.

Hereinafter, as another example of the combination of the polarization directions, a case will be described in which the combination of the polarization directions of the polarization filters 14A, 14B, and 14C respectively comprised in the optical regions 12A, 12B, and 12C of the optical system 10 is 0°, 45°, and 90° and the combination of the polarization directions of the polarization elements 122A, 122B, and 122C respectively provided in the pixels 102A, 102B, and 102C of each pixel unit U(x, y) is 0°, 60°, and 120°.

[Configuration of Device]

Here, as an example, a case will be described in which the combination of the polarization directions (azimuth angles) of the polarization filters 14A, 14B, and 14C respectively comprised in the optical regions 12A, 12B, and 12C of the optical system 10 and the combination of the polarization directions (azimuth angles) of the polarization elements 122A, 122B, and 122C respectively comprised in the pixels 102A, 102B, and 102C of the imaging element 100 are changed in the imaging device 1 according to the second embodiment.

It is assumed that the polarization direction (azimuth angle) of the first polarization filter 14A comprised in the first optical region 12A of the optical system 10 is 0°, the polarization direction (azimuth angle) of the second polarization filter 14B comprised in the second optical region 12B is 45°, and the polarization direction (azimuth angle) of the third polarization filter 14C comprised in the third optical region 12C is 90°. In this case, light (linearly polarized light) having an azimuth angle of 0° is emitted from the first optical region 12A, light (linearly polarized light) having an azimuth angle of 45° is emitted from the second optical region 12B, and light (linearly polarized light) having an azimuth angle of 90° is emitted from the third optical region 12C.

It is assumed that the polarization direction (azimuth angle) of the polarization element 122A comprised in the first pixel 102A of the imaging element 100 is 0°, the polarization direction (azimuth angle) of the polarization element 122B comprised in the second pixel 102B is 45°, and the polarization direction (azimuth angle) of the polarization element 122C comprised in the third pixel 102C is 90°. In this case, the first pixel 102A receives light (linearly polarized light) having an azimuth angle of 0°, the second pixel 102B receives light (linearly polarized light) having an azimuth angle of 45°, and the third pixel 102C receives light (linearly polarized light) having an azimuth angle of 90°.

[Image Generation]

Figure 17:
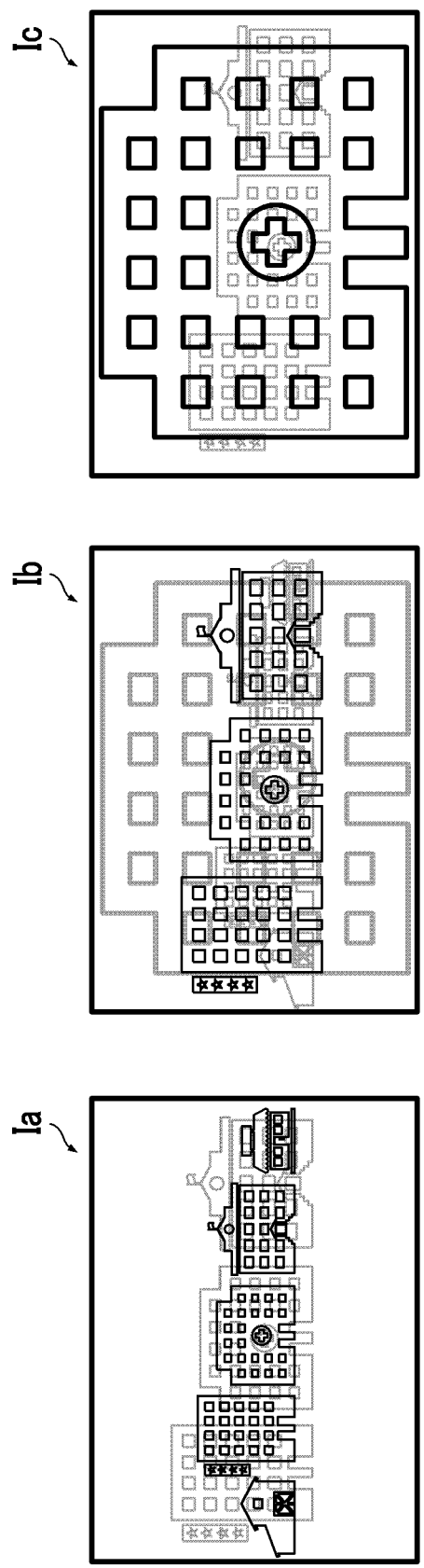
FIG. 17 is a diagram illustrating an example of the captured images (images before crosstalk removal).

FIG. 17 is a diagram illustrating an example of the captured images (images before crosstalk removal).

An image Ia is generated by extracting a pixel signal from the first pixel 102A of each pixel unit U(x, y). The image Ia is mainly a wide-angle image acquired by the first optical region 12A, and a telephoto image acquired by the second optical region 12B is mixed in the image Ia (the telephoto acquired by the second optical region 12B appears faintly).

An image Ib is generated by extracting the pixel signal of the second pixel 102B of each pixel unit U(x, y). The image Ib is mainly the telephoto image acquired by the second optical region 12B, and the wide-angle image acquired by the first optical region 12A and the image acquired by the third optical region 12C are mixed in the image b (the wide-angle image acquired by the first optical region 12A and the image acquired by the third optical region 12C appear faintly).

An image Ic is generated by extracting a pixel signal from the third pixel 102C of each pixel unit U(x, y). The image Ic is mainly the super-telephoto image acquired by the third optical region 12C, and the telephoto image acquired by the second optical region 12B is mixed in the image Ic (the image acquired by the second optical region 12B appears faintly).

The ratio (the amount of crosstalk) at which the light incident on each of the optical regions 12A, 12B, and 12C is received by each of the pixels 102A, 102B, and 102C is calculated by the square of the cosine (cos) of an angular difference between the polarization direction of light passing through each of the optical regions 12A, 12B, and 12C and the polarization direction of light received by each of the pixels 102A, 102B, and 102C. Therefore, for example, assuming that the polarization direction (azimuth angle) of the light (linearly polarized light) that has passed through the j-th optical region is $\alpha j$ and the polarization direction (azimuth angle) of the light received by the i-th pixel is $\beta i$, the ratio (the amount of crosstalk) at which the light incident on the j-th optical region is received by the i-th pixel is calculated by $\cos^2(|\alpha j - \beta i|)$. Therefore, each element bij of the matrix B is calculated by $\cos^2(|\alpha j - \beta i|)$.

Here, assuming that the ratio (the amount of crosstalk) at which the light incident on the first optical region 12A is received by the first pixel 102A is b11, the ratio at which the light incident on the second optical region 12B is received by the first pixel 102A is b12, and the ratio at which the light incident on the third optical region 12C is received by the first pixel 102A is b13, b11=1, b12=0.5, and b13=0 are established. In addition, assuming that the ratio at which the light incident on the first optical region 12A is received by the second pixel 102B is b21, the ratio at which the light incident on the second optical region 12B is received by the second pixel 102B is b22, and the ratio at which the light incident on the third optical region 12C is received by the second pixel 102B is b23, b21=0.5, b22=1, and b23=0.5 are established. Further, assuming that the ratio at which the light incident on the first optical region 12A is received by the third pixel 102C is b31, the ratio at which the light incident on the second optical region 12B is received by third pixel 102C is b32, and the ratio at which the light incident on the third optical region 12C is received by third pixel 102C is b33, b31=0, b32=0.5, and b33=1 are established. Therefore, the matrix B is set as follows.

$$B = \begin{bmatrix} 1 & 0.5 & 0 \\ 0.5 & 1 & 0.5 \\ 0 & 0.5 & 1 \end{bmatrix}$$

The inverse matrix $B^{-1}$ of the matrix B exists, and each element aij is as follows: a11=1.5; a12=−1; a13=0.5; a21=−1; a22=2; a23=−1; a31=0.5; a32=−1; and a33=1.5.

$$B^{-1} = \begin{bmatrix} 1.5 & -1 & 0.5 \\ -1 & 2 & -1 \\ 0.5 & -1 & 1.5 \end{bmatrix} = A$$

The coefficient storage unit 200C stores, as a coefficient group, each element aij of the matrix A of three rows and three columns calculated as the inverse matrix $B^{-1}$ of the matrix B.

The image generation unit 200B calculates pixel signals X1, X2, and X3 respectively corresponding to the optical regions 12A, 12B, and 12C using the following Expression 7 for three pixel signals x1, x2, and x3 obtained from each pixel unit U(x, y) to generate the images of the optical regions 12A, 12B, and 12C.

$$\begin{bmatrix} X1 \\ X2 \\ X3 \end{bmatrix} = \begin{bmatrix} 1.5 & -1 & 0.5 \\ -1 & 2 & -1 \\ 0.5 & -1 & 1.5 \end{bmatrix} * \begin{bmatrix} x1 \\ x2 \\ x3 \end{bmatrix} \quad \text{(Expression 7)}$$

Each of the generated images of the optical regions 12A, 12B, and 12C is a clear image without crosstalk (see FIG. 16).

As such, the combinations of the polarization directions of the polarization filters 14A, 14B, and 14C respectively comprised in the optical regions 12A, 12B, and 12C of the optical system 10 and the polarization elements 122A, 122B, and 122C respectively comprised in the pixels 102A, 102B, and 102C of each pixel unit U(x, y) may be different from each other.

In addition, the configuration in which the combination of the polarization directions of the polarization filters comprised in each optical region is the same as the combination of the polarization directions of the polarization elements comprised in each pixel of each pixel unit makes it possible to simplify the process of calculating the matrix A. That is, it is possible to simplify the process of setting the matrix B and calculating the inverse matrix $B^{-1}$ of the matrix B.

Fourth Embodiment

In the imaging devices 1 according to the first and second embodiments, the number of optical regions comprised in the optical system 10 is equal to the number of pixels comprised in each pixel unit U(x, y) of the imaging element 100. The number of pixels comprised in each pixel unit U(x, y) of the imaging element 100 is not necessarily three. Each pixel unit may comprise at least three pixels that receive light in different polarization directions. Therefore, each pixel unit U(x, y) of the imaging element 100 may be composed of four pixels. Hereinafter, a case in which each pixel unit U(x, y) of the imaging element 100 is composed of four pixels will be described.

[Imaging Element]

The basic configuration of the imaging element 100 is the same as that of the imaging element 100 of the imaging device 1 according to the first embodiment. That is, the imaging element 100 has a pixel array layer 110, a polarization element array layer 120, and a microlens array layer 130.

Figure 18:
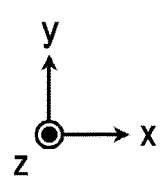
FIG. 18 is a diagram illustrating an example of the arrangement of pixels in an imaging element.

FIG. 18 is a diagram illustrating an example of the arrangement of pixels in the imaging element.

The imaging element 100 includes a plurality of units each of which is a set of four pixels including one first pixel 102A (the image of A in FIG. 18), one second pixel 102B (the image of B in FIG. 18), one third pixel 102C (the image of C in FIG. 18), and one fourth pixel 102D (the image of D in FIG. 18). The unit which is a set of four pixels is referred to as a pixel unit U(x, y). As illustrated in FIG. 18, the pixel units U(x, y) are regularly arranged along the x-axis direction and the y-axis direction.

The pixels of the pixel unit U(x, y) comprise polarization elements having different polarization directions. The first pixel 102A comprises a polarization element that transmits light having an azimuth angle of 0°. Therefore, the first pixel 102A receives light (linearly polarized light) having an azimuth angle of 0°. The second pixel 102B comprises a polarization element that transmits light having an azimuth angle of 45°. Therefore, the second pixel 102B receives light (linearly polarized light) having an azimuth angle of 45°. The third pixel 102C comprises a polarization element that transmits light having an azimuth angle of 90°. Therefore, the third pixel 102C receives light having an azimuth angle of 90°. The fourth pixel 102D comprises a polarization element that transmits light having an azimuth angle of 135°. Therefore, the fourth pixel 102D receives light having an azimuth angle of 135°.

[Optical System]

It is assumed that the optical system 10 comprises three optical regions 12A, 12B, and 12C having different focal lengths as in the imaging device 1 according to the second embodiment. However, in the imaging device 1 according to this embodiment, the first polarization filter 14A comprised in the first optical region 12A is configured to transmit light having an azimuth angle of 0°, the second polarization filter 14B comprised in the second optical region 12B is configured to transmit light having an azimuth angle of 45°, and the third polarization filter 14C comprised in the third optical region 12C is configured to transmit light having an azimuth angle of 90°. Therefore, in the optical system 10 according to this embodiment, light (linearly polarized light) having an azimuth angle of 0° is emitted from the first optical region 12A, light (linearly polarized light) having an azimuth angle of 45° is emitted from the second optical region 12B, and light having an azimuth angle of 90° (linearly polarized light) is emitted from the third optical region 12C.

[Signal Processing]

The signal processing unit 200 processes a signal (pixel signal) of each pixel obtained from the imaging element 100 for each pixel unit U(x, y) to generate images obtained by each of the optical regions 12A, 12B, and 12C of the optical system 10.

Figure 19:
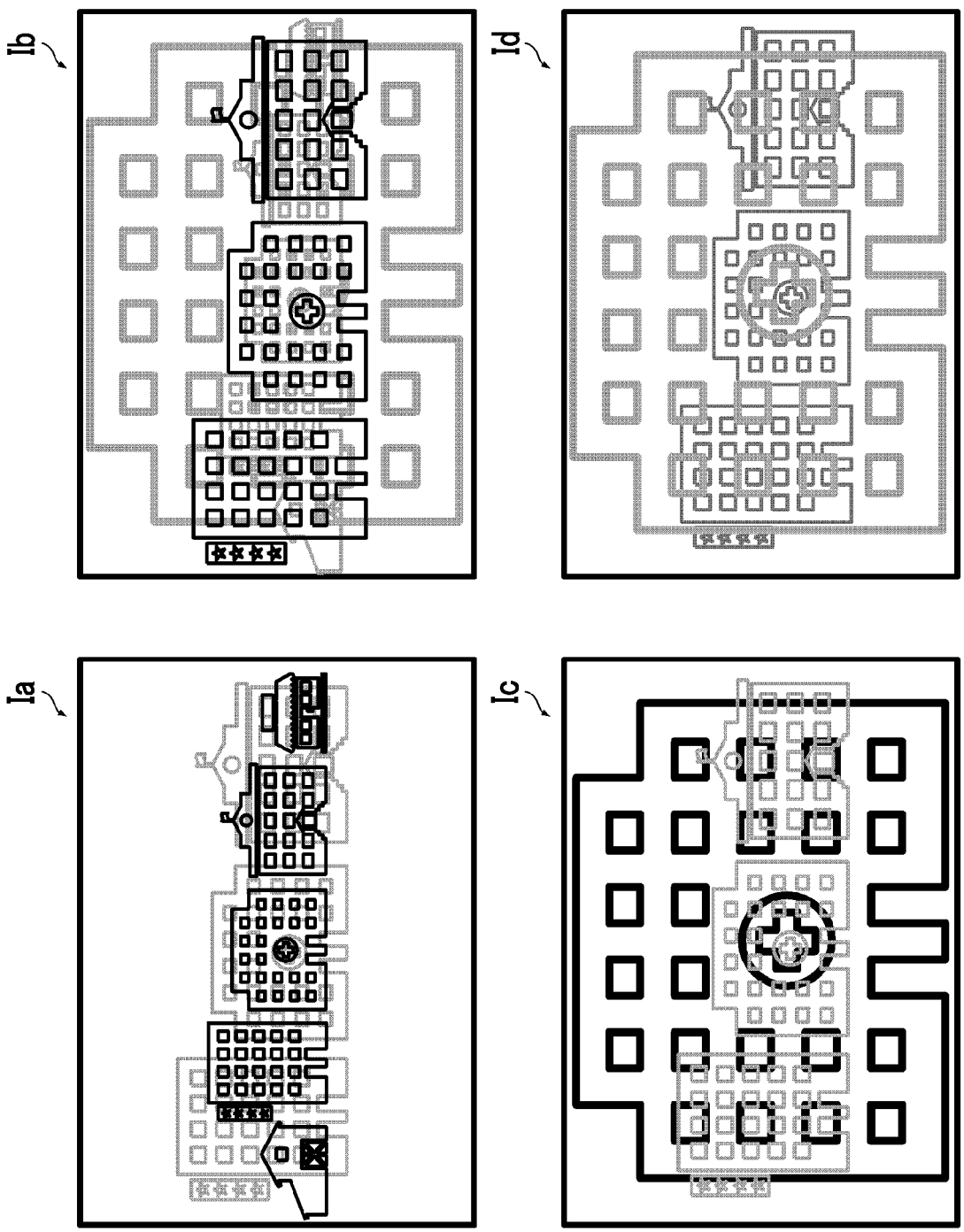
FIG. 19 is a diagram illustrating an example of the captured images (images before crosstalk removal).

FIG. 19 is a diagram illustrating an example of the captured images (images before crosstalk removal). FIG. 19 illustrates the images generated from the pixel signals of each pixel unit U(x, y) in a case in which imaging is performed in the imaging situation illustrated in FIG. 14.

An image Ia is generated by extracting a pixel signal from the first pixel 102A of each pixel unit U(x, y). The image Ia is mainly a wide-angle image acquired by the first optical region 12A, and the image acquired by the second optical region 12B is mixed in the image Ia. That is, the telephoto image acquired by the second optical region 12B appears faintly. The reason is that, while the polarization directions (azimuth angles) of light passing through the first optical region 12A, the second optical region 12B, and the third optical region 12C are 0°, 45°, and 90°, respectively, the polarization direction (azimuth angle) of light received by the first pixel 102A is 0°.

An image Ib is generated by extracting the pixel signal of the second pixel 102B of each pixel unit U(x, y). The image Ib is mainly the telephoto image acquired by the second optical region 12B, and the wide-angle image acquired by the first optical region 12A and a super-telephoto image acquired by the third optical region 12C are mixed in the image Ib (the wide-angle image acquired by the first optical region 12A and the super-telephoto image acquired by the third optical region 12C appear faintly). The reason is that, while the polarization directions (azimuth angles) of light passing through the first optical region 12A, the second optical region 12B, and the third optical region 12C are 0°, 45°, and 90°, respectively, the polarization direction (azimuth angle) of light received by the second pixel 102B is 45°.

An image Ic is generated by extracting a pixel signal from the third pixel 102C of each pixel unit U(x, y). The image Ic is mainly the super-telephoto image acquired by the third optical region 12C, and the telephoto image acquired by the second optical region 12B is mixed in the image Ic (the telephoto image acquired by the second optical region 12B appears faintly). The reason is that, while the polarization directions (azimuth angles) of light passing through the first optical region 12A, the second optical region 12B, and the third optical region 12C are 0°, 45°, and 90°, respectively, the polarization direction (azimuth angle) of light received by the third pixel 102C is 90°.

An image Id is generated by extracting a pixel signal from the fourth pixel 102D of each pixel unit U(x, y). In the image Id, the images acquired by the first optical region 12A and the third optical region 12C are equally mixed. The reason is that, while the polarization directions (azimuth angles) of light passing through the first optical region 12A, the second optical region 12B, and the third optical region 12C are 0°, 45°, and 90°, respectively, the polarization direction (azimuth angle) of light received by the fourth pixel 102D is 135°.

The image generation unit 200B of the signal processing unit 200 calculates pixel signals X1, X2, and X3 respectively corresponding to the optical regions 12A, 12B, and 12C for four pixel signals x1, x2, x3, and x4 obtained from each pixel unit U(x, y) with the following Expression 8 using the matrix A to remove crosstalk.

$$A = \begin{bmatrix} a11 & a12 & a13 & a14 \\ a21 & a22 & a23 & a24 \\ a31 & a32 & a33 & a34 \end{bmatrix}$$

$$\begin{bmatrix} X1 \\ X2 \\ X3 \end{bmatrix} = \begin{bmatrix} a11 & a12 & a13 & a14 \\ a21 & a22 & a23 & a24 \\ a31 & a32 & a33 & a34 \end{bmatrix} * \begin{bmatrix} x1 \\ x2 \\ x3 \\ x4 \end{bmatrix} \quad \text{(Expression 8)}$$

In addition, each element aij (i=1, 2, 3; j=1, 2, 3, 4) of the matrix A is calculated as follows.

Here, assuming that the ratio (the amount of crosstalk) at which the light incident on the first optical region 12A is received by the first pixel 102A is b11, the ratio at which the light incident on the second optical region 12B is received by the first pixel 102A is b12, and the ratio at which the light incident on the third optical region 12C is received by the first pixel 102A is b13, the following relationship is established between x1 and X1, X2, and X3.

$$b11*X1+b12*X2+b13*X3=x1 \quad \text{(Expression 9)}$$

In addition, assuming that the ratio at which the light incident on the first optical region 12A is received by the second pixel 102B is b21, the ratio at which the light incident on the second optical region 12B is received by the second pixel 102B is b22, and the ratio at which the light incident on the third optical region 12C is received by the second pixel 102B is b23, the following relationship is established between x2 and X1, X2, and X3.

$$b21*X1+b22*X2+b23*X3=x2 \quad \text{(Expression 10)}$$

Further, assuming that the ratio at which the light incident on the first optical region 12A is received by the third pixel 102C is b31, the ratio at which the light incident on the second optical region 12B is received by the third pixel 102C is b32, and the ratio at which the light incident on the third optical region 12C is received by the third pixel 102C is b33, the following relationship is established between x3 and X1, X2, and X3.

$$b31*X1+b32*X2+b33*X3=x3 \quad \text{(Expression 11)}$$

Furthermore, assuming that the ratio at which the light incident on the first optical region 12A is received by the fourth pixel 102D is b41, the ratio at which the light incident on the second optical region 12B is received by the fourth pixel 102D is b42, and the ratio at which the light incident on the third optical region 12C is received by the fourth pixel 102D is b43, the following relationship is established between x4 and X1, X2, and X3.

$$b41*X1+b42*X2+b43*X3=x4 \quad \text{(Expression 12)}$$

The simultaneous equations of Expressions 9 to 12 can be represented by the following Expression 13 using the matrix B.

$$B = \begin{bmatrix} b11 & b12 & b13 \\ b21 & b22 & b23 \\ b31 & b32 & b33 \\ b41 & b42 & b43 \end{bmatrix}$$

$$\begin{bmatrix} b11 & b12 & b13 \\ b21 & b22 & b23 \\ b31 & b32 & b33 \\ b41 & b42 & b43 \end{bmatrix} * \begin{bmatrix} X1 \\ X2 \\ X3 \end{bmatrix} = \begin{bmatrix} x1 \\ x2 \\ x3 \\ x4 \end{bmatrix} \quad \text{(Expression 13)}$$

As described above, the matrix A is the inverse matrix $B^{-1}$ of the matrix B ($A=B^{-1}$). Therefore, each element aij (i=1, 2, 3, j=1, 2, 3, 4) of the matrix A can be acquired by calculating the inverse matrix $B^{-1}$ of the matrix B.

Each element bij (i=1, 2, 3, 4, j=1, 2, 3) of the matrix B is the ratio at which light incident on the j-th optical region is received by the i-th pixel. The ratio is calculated by the square of the cosine (cos) of an angular difference between the polarization direction (azimuth angle) of the light passing through the j-th optical region and the polarization direction (azimuth angle) of the light received by the i-th pixel. Therefore, for example, assuming that the polarization direction (azimuth angle) of the light passing through the j-th optical region is αj and the polarization direction (azimuth angle) of the light received by the i-th pixel is βi, the ratio is calculated by $\cos^2(|αj−βi|)$. That is, each element bij of the matrix B is calculated by $\cos^2(|αj−βi|)$.

In the imaging device 1 according to this embodiment, the polarization direction (azimuth angle) of the light (linearly polarized light) passing through the first optical region 12A is 0°. In addition, the polarization direction of the light passing through the second optical region 12B is 45°. Further, the polarization direction of the light passing through the third optical region 12C is 90°. Further, the polarization direction (azimuth angle) of the light (linearly polarized light) received by the first pixel 102A is 0°. Moreover, the polarization direction of the light received by the second pixel 102B is 45°. In addition, the polarization direction of the light received by the third pixel 102C is 90°. Further, the polarization direction of the light received by the fourth pixel 102D is 135°.

Therefore, each element bij of the matrix B is as follows: b11=1; b12=0.5; b13=0; b21=0.5; b22=1; b23=0.5; b31=0; b32=0.5; b33=1; b41=0.5; b42=0; and b43=0.5.

$$B = \begin{bmatrix} 1 & 0.5 & 0 \\ 0.5 & 1 & 0.5 \\ 0 & 0.5 & 1 \\ 0.5 & 0 & 0.5 \end{bmatrix}$$

The inverse matrix $B^{-1}$ of the matrix B exists, and each element aij (i=1, 2, 3; j=1, 2, 3, 4) is as follows: a11=0.75; a12=−0.25; a13=−0.25; a14=0.75; a21=0; a22=1; a23=0; a24=−1; a31=−0.25; a32=−0.25; a33=0.75; and a34=0.75.

$$B^{-1} = \begin{bmatrix} 0.75 & -0.25 & -0.25 & 0.75 \\ 0 & 1 & 0 & -1 \\ -0.25 & -0.25 & 0.75 & 0.75 \end{bmatrix} = A$$

Therefore, in the imaging device 1 according to this embodiment, the pixel signals X1, X2, and X3 respectively corresponding to the optical regions 12A, 12B, and 12C can be calculated by the following Expression 14.

$$\begin{bmatrix} X1 \\ X2 \\ X3 \end{bmatrix} = \begin{bmatrix} 0.75 & -0.25 & -0.25 & 0.75 \\ 0 & 1 & 0 & -1 \\ -0.25 & -0.25 & 0.75 & 0.75 \end{bmatrix} * \begin{bmatrix} x1 \\ x2 \\ x3 \\ x4 \end{bmatrix} \quad \text{(Expression 14)}$$

As illustrated in FIG. 16, the images of the optical regions 12A, 12B, and 12C generated from the calculated pixel signals X1, X2, and X3 are clear images without crosstalk.

As such, the number of pixels comprised in each pixel unit U(x, y) of the imaging element 100 is not necessarily three. Even in a case in which the number of pixels is equal to or greater than four, crosstalk can be removed and clear images can be generated.

In a case in which the pixel unit U(x, y) is composed of N pixels (N is an integer satisfying N≥3) that receive light in different polarization directions, three pixel signals X1, X2, and X3 respectively corresponding to the optical regions 12A, 12B, and 12C can be calculated by the following Expression 15 using the matrix A.

$$A = \begin{bmatrix} a11 & a12 & \cdots & a1N \\ a21 & a22 & \cdots & a2N \\ a31 & a32 & \cdots & a3N \end{bmatrix}$$

-continued $$\begin{bmatrix} X1 \\ X2 \\ X3 \end{bmatrix} = \begin{bmatrix} a11 & a12 & \cdots & a1N \\ a21 & a22 & \cdots & a2N \\ a31 & a32 & \cdots & a3N \end{bmatrix} * \begin{bmatrix} x1 \\ x2 \\ \vdots \\ xN \end{bmatrix}$$ (Expression 15)

In addition, i and j are integers satisfying $1 \leq i \leq 3$ and $1 \leq j \leq N$, respectively.

The matrix A is acquired by calculating the inverse matrix $B^{-1}$ of the matrix B that has, as an element, the ratio at which light incident on each optical region of the optical system 10 is received by each pixel of each pixel unit of the imaging element. Therefore, in a case in which the matrix B is set, the polarization direction of the polarization filter comprised in each optical region of the optical system and the polarization direction of the polarization element comprised in the pixel of each pixel unit may be set to satisfy the condition that the inverse matrix $B^{-1}$ of the matrix B is calculated.

As such, with the configuration in which one pixel unit is composed of four or more pixels, it is possible to perform redundant imaging using a plurality of pixels, and the amount of light received is increased. Therefore, the final image with less noise is obtained.

Other Embodiments

[Configuration of Optical System]

In the above-described embodiments, the case in which the optical regions of the optical system have different focal lengths and the case in which the optical regions of the optical system focus on the objects at different distances have been described as examples. However, the configuration of the optical system is not limited thereto. In addition, for example, the optical regions may be configured to transmit light in different wavelength bands. Further, the optical regions may be configured to have parallax therebetween. For example, two of the three optical regions may be set to the same focal length to capture an image having horizontal parallax. Alternatively, all of the three optical regions may be set to the same focal length to capture an image having parallax of three points of view. Therefore, for example, it is possible to capture a stereoscopic image with one imaging element. In addition, it is possible to measure the distance.

Further, in the above-described embodiments, the optical region (pupil region) of the optical system is divided into three regions in a concentric circle shape. However, the aspect of the division is not limited thereto.

Figure 20:
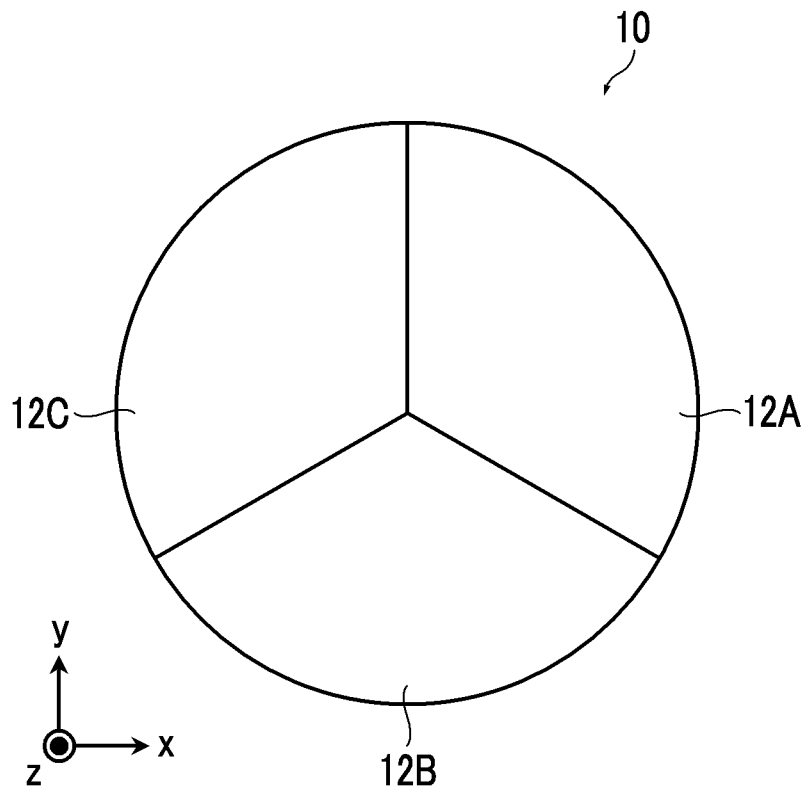
FIG. 20 is a diagram illustrating another example of the division of the optical region.

FIG. 20 is a diagram illustrating another example of the division of the optical region.

As illustrated in FIG. 20, the pupil portion may be divided into three regions in the circumferential direction. In this case, for example, an image having parallax of three points of view can be captured by setting the three regions to the same focal length. Further, for example, an image having horizontal parallax can be captured by setting two left and right regions to the same focal length.

Figure 21:
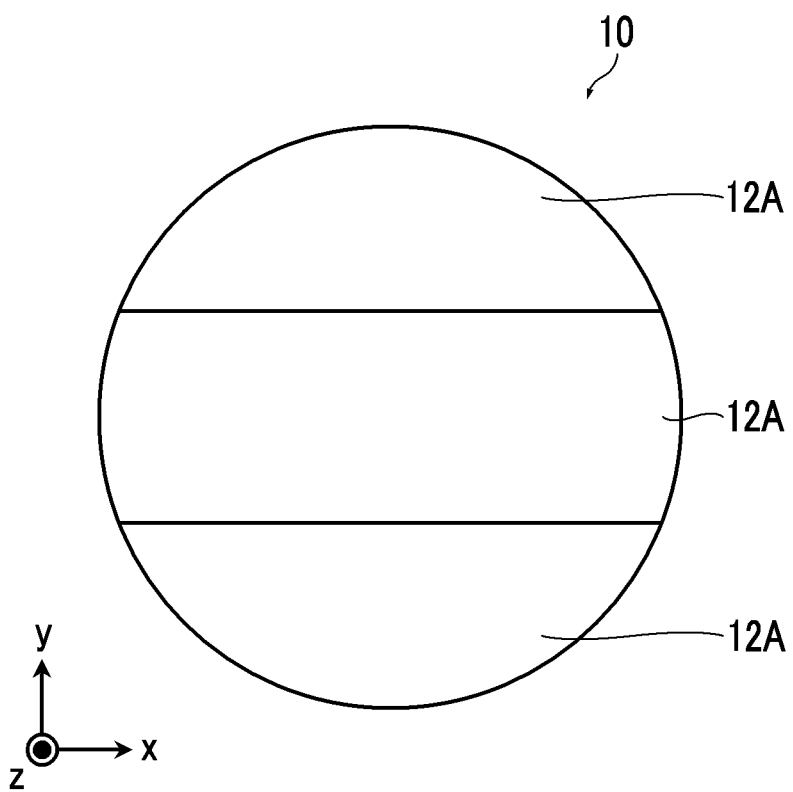
FIG. 21 is a diagram illustrating another example of the division of the optical region.

FIG. 21 is a diagram illustrating another example of the division of the optical region.

As illustrated in FIG. 21, the pupil portion may be divided into three regions in the vertical direction.

Figure 22:
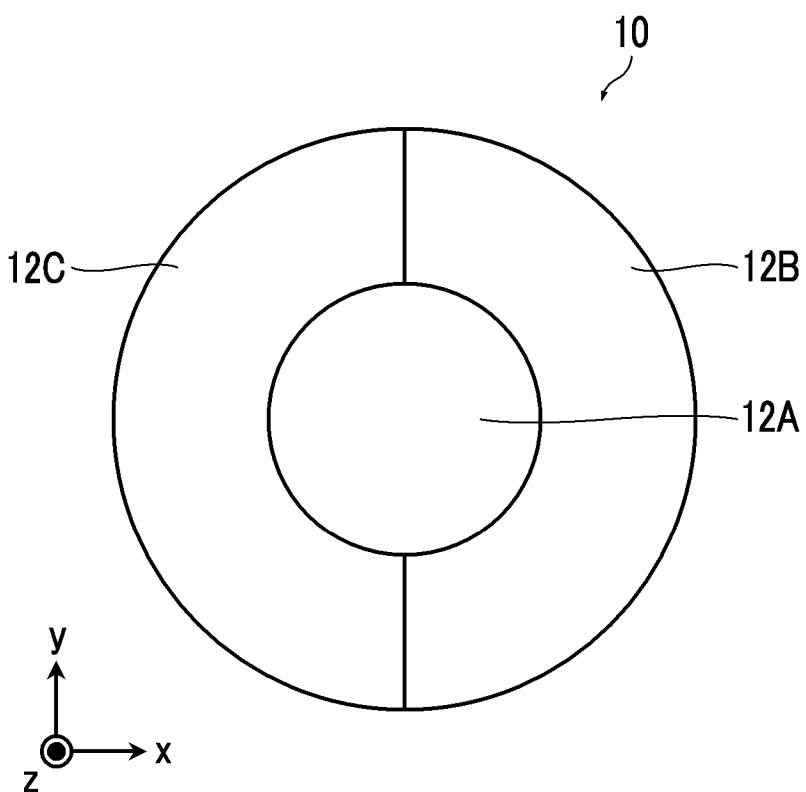
FIG. 22 is a diagram illustrating another example of the division of the optical region.

FIG. 22 is a diagram illustrating another example of the division of the optical region.

As illustrated in FIG. 22, the pupil portion may be divided into a central region and an outer peripheral region, and the outer peripheral region may be further divided into two left and right regions. In this case, for example, an image having horizontal parallax can be captured by setting the two left and right outer peripheral regions to the same focal length.

[Configuration of Imaging Element]

The arrangement of the pixels constituting one pixel unit is not limited to the arrangement according to the above-described embodiments.

Figure 23:
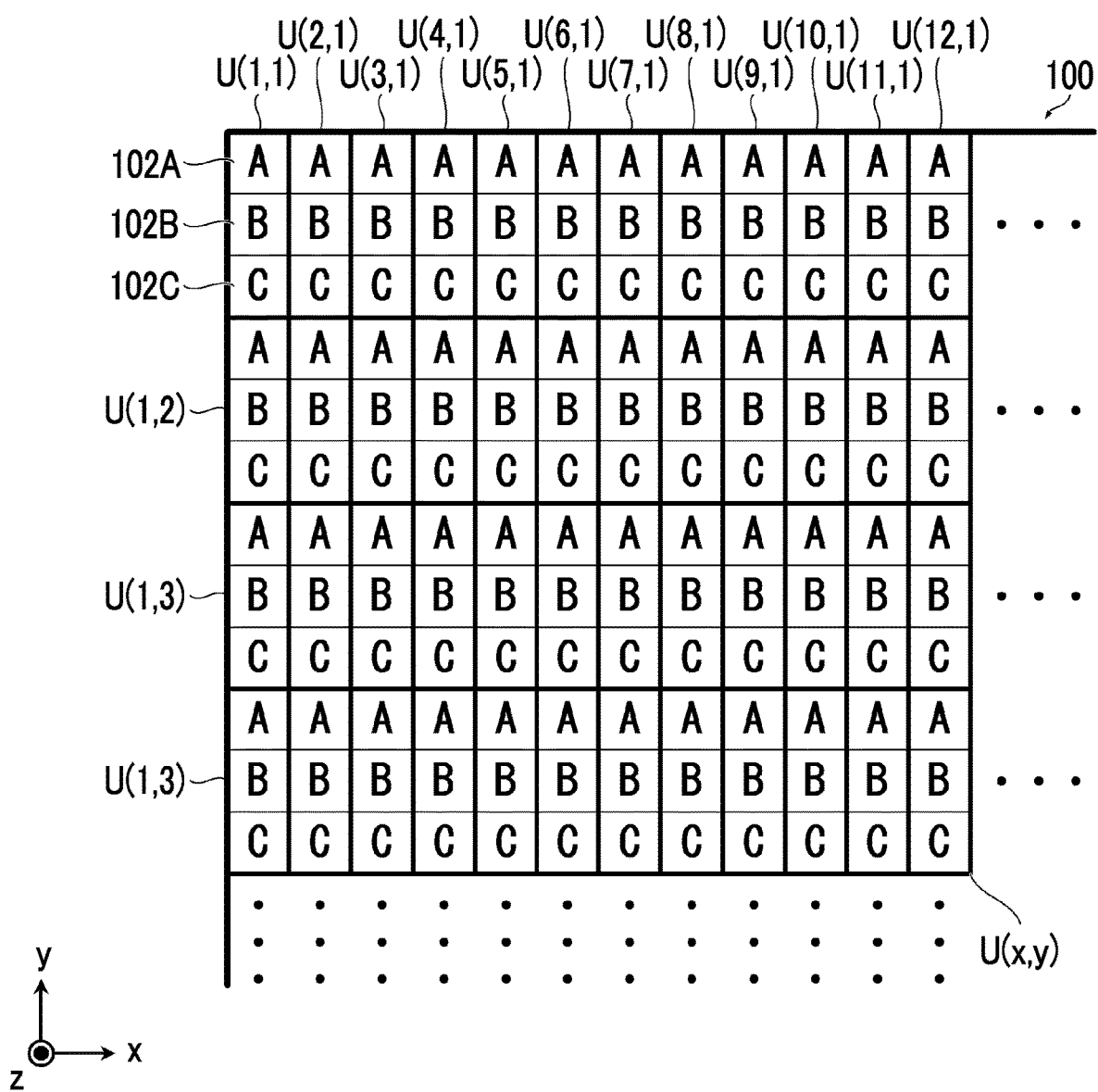
FIG. 23 is a diagram illustrating another example of the arrangement of the pixels.

FIG. 23 is a diagram illustrating another example of the arrangement of the pixels.

As illustrated in FIG. 23, a set of three pixels 102A, 102B, and 102C arranged in a line along the vertical direction (y direction) may constitute one pixel unit U(x, y), and the sets may be regularly arranged along the x direction and the y direction.

Figure 24:
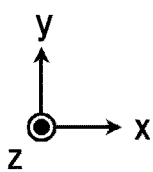
FIG. 24 is a diagram illustrating another example of the arrangement of the pixels.

FIG. 24 is a diagram illustrating another example of the arrangement of the pixels.

As illustrated in FIG. 24, a set of three pixels 102A, 102B, and 102C arranged in a line along the horizontal direction (x direction) may constitute one pixel unit U(x, y), and the sets may be regularly arranged along the x direction and the y direction.

Figure 25:
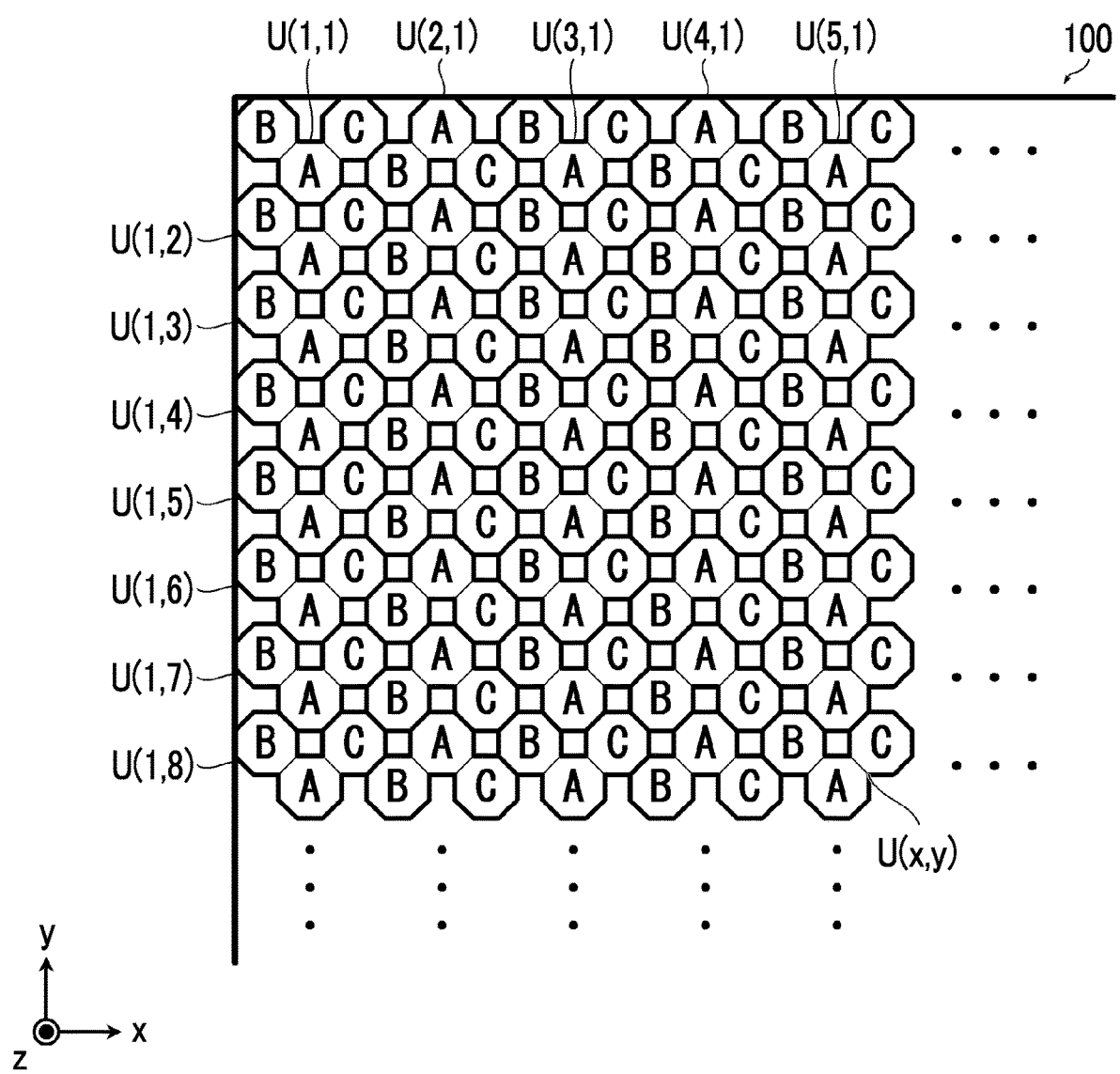
FIG. 25 is a diagram illustrating another example of the arrangement of the pixels.

FIG. 25 is a diagram illustrating another example of the arrangement of the pixels.

In an imaging element 100 illustrated in FIG. 25, pixels have an octagonal shape and the positions of the pixels in each horizontal line deviate from each other by ½ pitch in the horizontal direction (x direction) such that the pixels are disposed in a grid pattern. In this case, one pixel unit U(x, y) is configured as a set of three pixels.

In addition, in a case in which a color image is generated, a color filter is disposed in each pixel unit. For example, red, green, and blue color filters are disposed in each pixel unit in a predetermined filter array (for example, a Bayer array).

Further, in the above-described embodiments, the polarization element is disposed between the photodiode and the microlens. However, the polarization element may be disposed in front of the microlens (on the object side). In addition, the disposition of the polarization element between the microlens and the photodiode makes it possible to effectively prevent light from being mixed into adjacent pixels. Therefore, it is possible to further prevent crosstalk.

[Configuration of Signal Processing Unit]

The function of the image generation unit 200B (arithmetic unit) in the signal processing unit 200 can be implemented by using various processors. The various processors include, for example, a central processing unit (CPU) which is a general-purpose processor that executes software (program) to implement various functions. In addition, the various processors include, for example, a graphics processing unit (GPU) which is a processor specialized in image processing and a programmable logic device (PLD), such as a field programmable gate array (FPGA), which is a processor whose circuit configuration can be changed after manufacture. Further, the various processors include, for example, a dedicated electric circuit, such as an application specific integrated circuit (ASIC), which is a processor having a dedicated circuit configuration designed to perform a specific process.

The functions of each unit may be implemented by one processor or a combination of a plurality of processors of the same type or different types (for example, a combination of a plurality of FPGAs, a combination of a CPU and an FPGA, or a combination of a CPU and a GPU). In addition, a plurality of functions may be implemented by one processor. A first example of the configuration in which a plurality of functions are implemented by one processor is an aspect in which one processor is configured by a combination of one or more CPUs and software and implements a plurality of functions. A representative example of this aspect is a server computer. A second example of the configuration is an aspect in which a processor that implements the functions of the entire system using one integrated circuit (IC) chip is used. A representative example of this aspect is a system on chip (SoC). As such, various functions are implemented by using one or more of the various processors as the hardware structure. In addition, specifically, an electric circuit (circuitry) obtained by combining circuit elements, such as semiconductor elements, is used as the hardware structure of the various processors. These electric circuits may be electric circuits that implements the above-mentioned functions using OR, AND, NOT, exclusive OR, and logical operations obtained by combining them.

In a case in which the above-mentioned processor or electric circuit executes software (program), a processor (computer) readable code of the software to be executed is stored in a non-temporary recording medium, such as a read only memory (ROM), and the processor refers to the software. The software stored in the non-temporary recording medium includes a program for performing, for example, image input, image analysis, and display control. The code may be recorded on non-temporary recording media, such as various magneto-optical recording devices and semiconductor memories, instead of the ROM. In the case of processes using software, for example, a random access memory (RAM) may be used as a temporary storage area. In addition, for example, data stored in an electronically erasable and programmable read only memory (EEPROM) (not illustrated) may be referred to.

The coefficient storage unit 200C of the signal processing unit 200 can be implemented by, for example, a memory such as a read only memory (ROM) or an electronically erasable and programmable read only memory (EEPROM).

[Signal Processing Method]

One pixel unit may be composed of four or more pixels having different polarization directions, and the image of each optical region may be generated using pixel signals from three pixels among the four or more pixels. For example, in a case in which one pixel unit is configured as a set of four pixels that receive light having azimuth angles of 0°, 45°, 90°, and 135°, the image of each optical region may be generated using the pixel signals of the pixels that receive light having azimuth angles of 0°, 45°, and 90°.

[Configuration of Imaging Device]

The imaging device may be configured as an interchangeable lens imaging device in which an optical system is interchangeable. In this case, the matrix A is uniquely determined for each lens (optical system). Therefore, the matrix A is prepared for each lens, and the coefficient group of the matrix is stored in the coefficient storage unit. In a case in which the lens is interchanged, the coefficient group of the matrix A corresponding to the interchanged lens is read out from the coefficient storage unit, and arithmetic processing is performed to generate the image of each optical region.

EXPLANATION OF REFERENCES

1: imaging device
10: optical system
12A: first optical region
12B: second optical region
12C: third optical region
14A: first polarization filter
14B: second polarization filter
14C: third polarization filter
100: imaging element
102A: first pixel
102B: second pixel
102C: third pixel
102D: fourth pixel
110: pixel array layer
112: photodiode
120: polarization element array layer
122A: first polarization element
122B: second polarization element
122C: third polarization element
130: microlens array layer
132: microlens
200: signal processing unit
200A: analog signal processing unit
200B: image generation unit
200C: coefficient storage unit
Aa: polarization transmission axis of first polarization filter
Ab: polarization transmission axis of second polarization filter
Ac: polarization transmission axis of third polarization filter
DA: first image data
DB: second image data
DC: third image data
Ia: image obtained from first pixel
Ib: image obtained from second pixel
Ic: image obtained from third pixel
Id: image obtained from fourth pixel
ImA: image of first optical region
ImB: image of second optical region
ImC: image of third optical region
L: optical axis
U(x, y): pixel unit

What is claimed is:

1. An imaging device comprising:
an optical system including three optical regions that transmit light in different polarization directions, and configured to focus on objects at different distances;
an imaging element including a plurality of pixel units each of which is a set of N pixels that receive light in different polarization directions, where N is an integer satisfying N≥3;
a memory that stores a coefficient group configured by a matrix A of 3 rows and N columns in which each element is represented by aij, where i is an integer satisfying 1≤i≤3 and j is an integer satisfying 1≤j≤N; and
a processor that acquires the coefficient group from the memory and calculates only three pixel signals X1, X2, and X3 corresponding to each of the optical regions of the optical system from N pixel signals x1, x2, . . . , xN obtained from each of the pixel units of the imaging element using the following expression $$\begin{bmatrix} X1 \\ X2 \\ X3 \end{bmatrix} = \begin{bmatrix} a11 & a12 & \cdots & a1N \\ a21 & a22 & \cdots & a2N \\ a31 & a32 & \cdots & a3N \end{bmatrix} * \begin{bmatrix} x1 \\ x2 \\ \vdots \\ xN \end{bmatrix},$$

wherein each of the three pixel signals X1, X2, X3 respectively corresponds to one of the objects at different distances.

2. The imaging device according to claim 1,
wherein the matrix A is acquired by calculating an inverse matrix of a matrix that has, as an element, a ratio at which light incident on each of the optical regions of the optical system is received by each of the pixels of each of the pixel units of the imaging element.

3. The imaging device according to claim 2,
wherein the ratio at which the light incident on each of the optical regions of the optical system is received by each of the pixels of each of the pixel units of the imaging element is acquired by calculating a square of a cosine of an angular difference between the polarization direction of light transmitted through each of the optical regions of the optical system and the polarization direction of light received by each of the pixels of each of the pixel units of the imaging element.

4. The imaging device according to claim 1,
wherein the imaging element includes a plurality of the pixel units each of which is a set of three pixels that receive light in different polarization directions.

5. The imaging device according to claim 1,
wherein a combination of the polarization directions of the light transmitted through each of the optical regions of the optical system is the same as a combination of the polarization directions of the light received by each of the pixels of each of the pixel units of the imaging element.

6. The imaging device according to claim 1,
wherein the optical system includes three polarization filters having different polarization directions which are provided at a pupil position.

7. The imaging device according to claim 1,
wherein the optical regions of the optical system have different focal lengths.

8. The imaging device according to claim 1,
wherein the optical regions of the optical system transmit light in different wavelength bands.

9. The imaging device according to claim 1,
wherein the optical regions of the optical system have parallax therebetween.

10. The imaging device according to claim 1,
wherein at least two of the optical regions of the optical system have parallax.

11. The imaging device according to claim 1,
wherein the imaging element includes a polarization element that is provided in each of the pixels.

12. The imaging device according to claim 11,
wherein, in the imaging element, the polarization element is provided between a photodiode and a microlens which constitute each of the pixels.

* * * * *